US011417022B2

United States Patent
Winger et al.

(10) Patent No.: US 11,417,022 B2
(45) Date of Patent: Aug. 16, 2022

(54) FRY ASSESSMENT SYSTEM AND METHOD

(71) Applicant: R.D. Offutt Farms Co., Fargo, ND (US)

(72) Inventors: Darrin Dale Winger, West Fargo, ND (US); Melissa Elizabeth Richards, Fargo, ND (US)

(73) Assignee: R.D. OFFUTT FARMS CO., Fargo, ND (US)

( * ) Notice: Subject to any disclaimer, the term of this patent is extended or adjusted under 35 U.S.C. 154(b) by 86 days.

(21) Appl. No.: 17/031,393

(22) Filed: Sep. 24, 2020

(65) Prior Publication Data

US 2021/0097721 A1 Apr. 1, 2021

Related U.S. Application Data

(60) Provisional application No. 62/907,241, filed on Sep. 27, 2019.

(51) Int. Cl.
*G06T 7/90* (2017.01)
*G06T 7/00* (2017.01)

(52) U.S. Cl.
CPC ............. *G06T 7/90* (2017.01); *G06T 7/0004* (2013.01); *G06T 2207/10024* (2013.01); *G06T 2207/30128* (2013.01)

(58) Field of Classification Search
CPC ..................... G06T 7/90; G06T 7/0004; G06T 2207/10024; G06T 2207/30128
USPC .................................................... 382/100
See application file for complete search history.

(56) References Cited

U.S. PATENT DOCUMENTS

| | | | |
|---|---|---|---|
| 2005/0208198 A1* | 9/2005 | Kossler | A61P 43/00 426/637 |
| 2010/0097452 A1 | 4/2010 | Torre-Bueno | |
| 2011/0050880 A1* | 3/2011 | Bourg, Jr. | G06T 7/90 382/110 |
| 2014/0056482 A1* | 2/2014 | Burgstaller | B07C 5/3422 382/110 |
| 2016/0235081 A1* | 8/2016 | Salminen | A23B 7/154 |
| 2017/0109599 A1* | 4/2017 | Gupta | G06V 10/56 |
| 2018/0116264 A1 | 5/2018 | De Winter et al. | |
| 2020/0323228 A1* | 10/2020 | Tornberg | A23L 19/14 |

OTHER PUBLICATIONS

International Search Report & Written Opinion, for Application No. PCT/US2020/052521, dated Dec. 31, 2020.

* cited by examiner

*Primary Examiner* — Ali Bayat
(74) *Attorney, Agent, or Firm* — Snell & Wilmer L.L.P.

(57) ABSTRACT

A fry assessment system (10) is disclosed and includes an image analyzer (12). The image analyzer (12) includes both a fry identification module (90) and a fry scoring module (100). A color image (70) is analyzed by the fry identification module (90) to identify all fries in the color image (70). Thereafter, the fry scoring module (100) determines a score for each identified fry in the color image (70). These determined scores may be used for any appropriate purpose, for instance for purposes of determining a selling price for associated potatoes, to monitor a condition of associated potatoes in a common storage area, or the like.

25 Claims, 9 Drawing Sheets

FRY ASSESSMENT SYSTEM AND METHOD

CROSS-REFERENCE TO RELATED APPLICATIONS

This patent application claims priority to U.S. Provisional Patent Application No. 62/907,241, that was filed on 27 Sep. 2019, and the entire disclosure of which is hereby incorporated by reference.

FIELD

The present invention generally relates to the field of potato products (e.g., French fries) and, more particularly, to the field of scoring potato products using computerized imaging analysis.

BACKGROUND

An entity may have potato supply contracts with various different vendors. A contract may provide for the entity to sell potatoes to a particular vendor by acre or by weight over a certain time frame (e.g., a year). Such a contract may also stipulate how much the vendor will pay for the potatoes based on potato quality. The better the quality, the higher the price of the potatoes. The quality of the potatoes may be determined by an associated fry color score.

The United States Department of Agriculture (USDA) has specific standards around commercial potato sales, specifically around French fries. Only potatoes with fry color scores within a range of 000-4 can be sold and used as French fries per USDA requirements. If a potato has a fry color test score greater than 4, it cannot be made into a French fry, but instead it must be used for hash browns or some other potato product. Potatoes with a very high color score are generally made into livestock feed as the USDA won't allow them to be sold for human consumption. Because of these USDA standards, potato prices are tied to fry color scores. Fries that have a low color score, like 0, are worth far more money than potatoes with a color score of 4. Known fry color scoring is a manual process—meaning that an individual would look at a potato and visually estimate it's color score based upon their personal visual analysis (e.g., using a color-coded chart provided by the USDA—a representation of a portion thereof being shown in FIG. 8). As can be appreciated, such a manual process can be quite subjective—it is very conceivable that different people will score the same fry differently. Moreover, the same person could issue varying score results, for instance based on environmental factors from day to day (e.g., lighting, vision), based on user bias towards lighter or darker fries, other personal considerations, or the like.

Fry color scores and potato sugar content are influenced by a number of factors. When a potato is growing in the field, everything from water quality to amount of water, soil quality and type, light amounts, disease pressure, etc. can influence the sugars in a potato and the fry color score it receives upon harvest. Bin conditions also play a major role in potato quality (where a "bin" is a potato storage facility, such as a potato warehouse). Bins usually have 1-4 fields of potatoes in them at one time. Once a potato field is harvested, those potatoes may be stored in a bin for up to 10 months before being sold. Humidity and climate conditions within the bin have been known to alter sugar levels and fry color scores relatively quickly.

SUMMARY

The present invention pertains to grading or scoring potatoes, including grading/scoring individual potato segments or potato products (e.g., French fries). A "potato segment" or "potato product" is one that is derived from a potato, including where multiple potato segments/products may be derived from a single potato. A "grade" or "score" in accordance with the present invention is based on the pixel level of a color image that includes one or more potato segments/products. That is, the "grading" or "scoring" in accordance with the present invention is executed by an image analyzer (e.g., one or more computers) that has been configured to grade/score a particular potato segment/product based upon pixel color data of this potato segment/product.

In a first aspect of the present invention, a color image of a potato segment/product is acquired using a camera. This color image is saved in memory of/accessible by the image analyzer. The pixel data of multiple pixels that are part of the potato segment/product in the color image are separately graded/scored by the image analyzer. The grades/scores for these individual pixels of the potato segment/product in the color image are used by the image analyzer to determine an overall grade/score for the potato segment/product.

A number of feature refinements and additional features are applicable to the first aspect of the present invention. These feature refinements and additional features may be used individually or in any combination. The following discussion is applicable to the present invention and including the first aspect. The camera and the image analyzer may be operatively interconnected in any appropriate manner (e.g., a cable that extends between the camera and image analyzer) such that the color image may be transferred directly from the camera to the image analyzer. Removable memory could also be used to transfer the color image from the camera to the image analyzer (e.g., a direct/operative connection need not exist between the camera and the image analyzer). The color image may be of any appropriate imaging format, including a digital image (e.g., JPEG).

Two different color values may be acquired for each of a plurality of pixels that are part of the potato segment/product in the color image (for instance, a first color value and a second color value). A plurality of grades/scores may be stored in memory of the image analyzer, with each grade/score having both a first color value requirement and a second color value requirement that is also stored in memory of the image analyzer. If the first color value of a given pixel complies with the first color value requirement associated with a certain grade/score, and if the second color value of this same pixel complies with the second color value requirement associated with this same grade/score, the pixel may be assigned this score by the image analyzer. The highest percentage of pixels of a particular potato segment/product that have a common grade/score, as determined by the image analyzer, may be used by the image analyzer to assign this same grade/score to the entire potato segment/product. In one embodiment, all of the pixels that define a particular potato segment/product in the color image are individually scored in accordance with the foregoing for purposes of determining the grade/score to be assigned to the potato segment/product by the image analyzer.

A color may be stored in memory of the image analyzer for each of the plurality of grades/scores that are also stored in memory of the image analyzer. If the first color value of a given pixel complies with the first color value requirement associated with a certain color in memory of the image analyzer, and if the second color value of this same pixel complies with the second color value requirement associated with this same color in memory of the image analyzer, the pixel may be assigned this color by the image analyzer. The image analyzer may display an electronic image of the potato segment/product, where each of its pixels that were assessed by the image analyzer are presented in their corresponding assigned color in accordance with the foregoing (a "re-colored" image of the potato segment/product may be presented/displayed).

The image analyzer may include or be operatively connected with a database. This database may be used to store a separate database record for each color image that is assessed by the image analyzer in accordance with the foregoing. Each such database record could include the grade/score that was assigned by the image analyzer for each potato segment/product in the color image. Each such database record could furthermore include for the re-colored image of each potato segment/product that was in the color image. Multiple database records may be stored in the database, and these multiple database records may span over any appropriate period of time. For instance, a plurality of database records may be retained in memory, where each database record is a separate sample from a bin, warehouse, or other storage receptacle/facility for potatoes.

A sample may include a plurality of potato segments/products. Each sample may be acquired from a common bin, warehouse, or other storage receptacle/facility for potatoes. The potato segments/products of each sample may be separately graded/scored by the image analyzer in accordance with the foregoing (each sample may have a corresponding color image). Samples may be acquired from the common bin on any appropriate timed basis and including periodically (e.g., monthly). The scores potato segments/products of at least two of the samples: 1) may be used to determine when to sell and/or process the potatoes from the common bin from which the samples were acquired; 2) may be used to adjust at least one condition in the common bin from which the samples were acquired; and 3) may be used to monitor a condition of the potatoes in the common bin from which the samples were acquired.

One or more potato segments/products may be positioned on a common base or tray. Such a tray may include a plurality of grooves or slots, with each groove/slot receiving a single potato segment/product. In any case, the color image that is acquired for purposes of the first aspect includes at least one potato segment/product positioned on such a base/tray. Pixel data may be used by the image analyzer to identify each potato segment/product that is positioned on the base/tray in the color image. That is, the image analyzer uses pixel data to distinguish a given potato segment/product from the base/tray in the color image. This then is used to identify one or more pixels in the color image that are used to grade/score the pixels (and thereby the potato segment/product) in accordance with the foregoing discussion.

In one embodiment, the color image is resized for purposes of identifying the potato segment(s)/product(s) included in the color image (e.g., for distinguishing the potato segment(s)/product(s) from the base/tray). All of the pixel data in the resized color image may be individually assessed by the image analyzer to identify each pixel in the resized color image that is part of a potato segment/product. Those pixels that have been identified as being part of a potato segment/product by the image analyzer, and furthermore that satisfy a proximity requirement and as determined by the image analyzer, may be characterized as being part of a common potato segment/product by the image analyzer. That is, some of the pixels in the resized color image may be determined by the image analyzer to be part of one potato segment/product, while other pixels in the resized color image may be determined by the image analyzer to be part of a different potato segment/product. The identity of each of the individual potato segments/products may be used to identify the same in a full-size color image of the potato segments/products on the base/tray, and each of these potato segments/products on the base/tray may be separately graded/scored by the image analyzer in accordance with the foregoing.

Various aspects of the present disclosure are also addressed by the following paragraphs and in the noted combinations:

1. A method for assessing a potato segment, comprising the steps of:
   acquiring a color image of a potato segment using a camera;
   transmitting said color image from said camera to memory that is computer-readable;
   reading data from each potato segment pixel of said color image in said memory, wherein each said potato segment pixel is designated as being part of said potato segment; and
   executing a potato segment scoring color analysis using a computer operatively interconnected with said memory and comprising:
   acquiring from said data at least a first color value and a second color value for each said potato segment pixel;
   assessing each said potato segment pixel in relation to at least one of a plurality of color value sets, wherein each color value set of said plurality of color value sets has at least a first color value requirement, a second color value requirement, and a score, wherein said first color value requirement, said second color value requirement, and said score of each said color value set is different from said first color value requirement, said second color value requirement, and said score for every other said color value set of said plurality of color value sets;
   executing a first assigning step comprising assigning each said potato segment pixel to said score for one of said plurality of color value sets and based upon its corresponding said first color value and said second color value complying with said first color value requirement and said second color value requirement of said one of said plurality of color value sets; and
   generating an assigned score for said potato segment, wherein said assigned score is said score that has been associated with the largest number of said potato segment pixels by said first assigning step.

2. The method of paragraph 1, wherein said potato segment is a fried French fry.

3. The method of any of paragraphs 1-2, wherein said first color value for each said potato segment pixel is a red color value and said second color value for each said potato segment pixel is a green color value.

4. The method of any of paragraphs 1-3, wherein each said potato segment pixel is stored as a 32-bit number in said memory by said computer, wherein said first color value is one 8-bit value of said 32-bit number and said second color value is a different 8-bit value of said 32-bit number.

5. The method of any of paragraphs 1-3, wherein each said potato segment pixel is stored as a 32-bit number in said memory by said computer, wherein said first color value is defined by bits 9-16 of said 32-bit number and said second color value is defined by bits 17-24 of said 32-bit number.

6. The method of any of paragraphs 4-5, wherein said computer comprises software that is configured to read said 32-bit number for each said potato segment pixel from said memory and to convert a first corresponding portion of said 32-bit number into said first color value and to convert a second corresponding portion of said 32-bit number into said second color value.

7. The method of any of paragraphs 1-6, wherein said first assigning step of said potato segment scoring color analysis fails to utilize a third color value of said potato segment pixel.

8. The method of paragraph 7, wherein said third color value of said potato segment pixel is a blue color value.

9. The method of any of paragraphs 1-8, wherein said plurality of color value sets includes only five different color value sets.

10. The method of any of paragraphs 1-9, wherein a number of said plurality of color value sets are equated with only five different colors.

11. The method of paragraph 10, wherein said five different colors are red, orange, yellow, yellow/green, and green.

12. The method of any of paragraphs 1-11:
wherein said plurality of color value sets comprises a fourth color value set, a third color value set, a second color value set, a first color value set, and a base color value set;
wherein a given said potato segment pixel is assigned by said first assigning step to said score of said fourth color value set if a fourth determining step is a pass and which requires both said first color value and said second color value of said given said potato segment pixel to comply with said first color value requirement and said second color value requirement, respectively, of said fourth color value set;
wherein a given said potato segment pixel is assigned by said first assigning step to said score of said third color value set if said fourth determining step is a fail and if a third determining step is a pass and which requires both said first color value and said second color value of said given said potato segment pixel to comply with said first color value requirement and said second color value requirement, respectively, of said third color value set;
wherein a given said potato segment pixel is assigned by said first assigning step to said score of said second color value set if said fourth determining step is a fail, if said third determining step is a fail, and if a second determining step is a pass and which requires both said first color value and said second color value of said given said potato segment pixel to comply with said first color value requirement and said second color value requirement, respectively, of said second color value set;
wherein a given said potato segment pixel is assigned by said first assigning step to said score of said first color value set if said fourth determining step is a fail, if said third determining step is a fail, if said second determining step is a fail, and if a first determining step is a pass and which requires both said first color value and said second color value of said given said potato segment pixel to comply with said first color value requirement and said second color value requirement, respectively, of said first color value set; and wherein a given said potato segment pixel is assigned by said first assigning step to said score of said base color value set if said fourth determining step fails, if said third determining step fails, if said second determining step fails, and if said first determining step fails.

13. The method of paragraph 12, wherein:
said first color value requirement of said fourth color value set is a red color value of less than 135 and said second color value requirement of said fourth color value set is a green color value of less than 100;
said first color value requirement of said third color value set is a red color value of less than 170 and said second color value requirement of said third color value set is a green color value of less than 135;
said first color value requirement of said second color value set is a red color value of less than 190 and said second color value requirement of said second color value set is a green color value of less than 160;
said first color value requirement of said first color value set is a red color value of less than 205 and said second color value requirement of said first color value set is a green color value of less than 175.

14. The method of any of paragraphs 12-13, wherein each said color value set further has a color, wherein said color of a given said color value set is different from said color for every other said color value set of said plurality of color value sets, said method further comprising the step of:
displaying an electronic image of said potato segment where each said potato segment pixel is presented in said color of said one of said plurality of color value sets.

15. The method of paragraph 14:
wherein a given said potato segment pixel is displayed in said color of said fourth color value set if said fourth determining step passes;
wherein a given said potato segment pixel is displayed in said color of said third color value set if said fourth determining step fails and if said third determining step passes;
wherein a given said potato segment pixel is displayed in said color of said second color value set if said fourth determining step fails, if said third determining step fails, and if said second determining step passes;
wherein a given said potato segment pixel is displayed in said color of said first color value set if said fourth determining step fails, if said third determining step fails, if said second determining step fails, and if said first determining step passes; and
wherein a given said potato segment pixel is displayed in said color of said base color value set if said fourth determining step fails, if said third determining step fails, if said second determining step fails, and if said first determining step fails.

16. The method of paragraph 15, wherein said color of said fourth color value set is red, said color of said third color value set is orange, said color of said second color value set is yellow, said color of said first color value set is yellow/green, and said color of said fourth color value set is green.

17. The method of any of paragraphs 1-11:
wherein said plurality of color value sets comprises a fourth color value set, a third color value set, a second color value set, a first color value set, and a base color value set;
wherein a given said potato segment pixel is assigned by said first assigning step to said score of said fourth color value set if said first color value of said given said potato segment pixel is within a first color value range of said first color value requirement for said fourth color value set and if said second color value of said given said potato segment pixel is within a second color value range of said second color value requirement for said fourth color value set;

wherein a given said potato segment pixel is assigned by said first assigning step to said score of said third color value set if said first color value of said given said potato segment pixel is within a first color value range of said first color value requirement for said third color value set and if said second color value of said given said potato segment pixel is within a second color value range of said second color value requirement for said third color value set;

wherein a given said potato segment pixel is assigned by said first assigning step to said score of said second color value set if said first color value of said given said potato segment pixel is within a first color value range of said first color value requirement for said second color value set and if said second color value of said given said potato segment pixel is within a second color value range of said second color value requirement for said second color value set;

wherein a given said potato segment pixel is assigned by said first assigning step to said score of said first color value set if said first color value of said given said potato segment pixel is within a first color value range of said first color value requirement for said first color value set and if said second color value of said given said potato segment pixel is within a second color value range of said second color value requirement for said first color value set;

wherein a given said potato segment pixel is assigned by said first assigning step to said score of said base color value set if said potato segment pixel is not assigned to said score for any of said first color value set, said second color value set, said third color value set, and said fourth color value set.

18. The method of paragraph 17, wherein:

said first color value range of said fourth color value set is a red color value of less than 135 and said second color value range of said fourth color value set is a green color value of less than 100;

said first color value range of said third color value set is a red color value from 135 to 170 and said second color value range of said third color value set is a green color value from 100 to 135;

said first color value range of said second color value set is a red color value from 170 to 190 and said second color value range of said second color value set is a green color value from 135 to 160;

said first color value range of said first color value set is a red color value from 190 to 205 and said second color value range of said first color value set is a green color value from 160 to 175.

19. The method of any of paragraphs 17-18, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

20. The method of paragraph 19:

wherein a given said potato segment pixel is displayed in said color of said fourth color value set if said first color value of said given said potato segment pixel is within said first color value range of said first color value requirement for said fourth color value set and if said second color value of said given said potato segment pixel is within said second color value range of said second color value requirement for said fourth color value set;

wherein a given said potato segment pixel is displayed in said color of said third color value set if said first color value of said given said potato segment pixel is within said first color value range of said first color value requirement for said third color value set and if said second color value of said given said potato segment pixel is within said second color value range of said second color value requirement for said third color value set;

wherein a given said potato segment pixel is displayed in said color of said second color value set if said first color value of said given said potato segment pixel is within said first color value range of said first color value requirement for said second color value set and if said second color value of said given said potato segment pixel is within said second color value range of said second color value requirement for said second color value set;

wherein a given said potato segment pixel is displayed in said color of said first color value set if said first color value of said given said potato segment pixel is within a first color value range of said first color value requirement for said first color value set and if said second color value of said given said potato segment pixel is within a second color value range of said second color value requirement for said first color value set; and wherein a given said potato segment pixel is displayed in said color of said base color value set if said potato segment pixel is not assigned to said color for any of said first color value set, said second color value set, said third color value set, and said fourth color value set.

21. The method of paragraph 20, wherein said color of said fourth color value set is red, said color of said third color value set is orange, said color of said second color value set is yellow, said color of said first color value set is yellow/green, and said color of said base color value set is green.

22. The method of any of paragraphs 12-21, wherein said score of said fourth color value set is a 4, wherein said score of said third color value set is a 3, wherein said score of said second color value set is a 2, wherein said score of said first color value set is a 1, and wherein said score of said base color value set is a 0.

23. The method of any of paragraphs 1-13, 17, and 18, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

24. The method of any of paragraphs 1-23, further comprising displaying said assigned score for said potato segment.
25. The method of paragraph 24, wherein said displaying step comprises displaying said assigned score on a monitor operatively interconnected with said computer.
26. The method of paragraph 24, wherein said displaying step comprises displaying said assigned score on a hard-copy report.
27. The method of any of paragraphs 1-26, further comprising the steps of:
disposing said potato segment on a base, wherein said color image comprises said potato segment and said base; and
distinguishing said potato segment from said base, wherein said distinguishing step is executed by said computer and comprises identifying each said potato segment pixel for purposes of said potato segment scoring color analysis.
28. The method of paragraph 27, wherein said base is a tray.
29. The method of any of paragraphs 27-28, wherein said base comprises a slot, and wherein said potato segment is positioned within said slot.
30. The method of any of paragraphs 27-29, wherein said distinguishing step comprises said computer executing a potato segment identification color analysis based on said color image.
31. The method of paragraph 30, wherein said potato segment identification color analysis comprises:
acquiring a first plurality of color values for each of a plurality of first pixels; and
assessing said first plurality of color values for each said first pixel against a plurality of color value relationships; and
identifying each said first pixel whose plurality of color values satisfy each of said plurality of color value relationships;
said method further comprising:
using said first pixels from said identifying step of said potato segment identification color analysis to identify each said potato segment in said color image, wherein each said potato segment in said color image is collectively defined by a different plurality of said potato segment pixels in said color image.
32. The method of paragraph 31, further comprising resizing said color image, wherein said potato segment identification color analysis is executed on said color image after said resizing step.
33. The method of any of paragraphs 31-32, wherein said first plurality of different color values for said potato segment identification color analysis comprises a first color value, a second color value, and a third color value.
34. The method of paragraph 33, wherein said plurality of color value relationships of said potato segment identification color analysis comprises a first color value relationship and a second color value relationship, wherein said assessing step of said potato segment identification color analysis in relation to a given said first pixel further comprises assessing said first color value of said given said first pixel and said second color value of said given said first pixel against each of said first color value relationship and said second color value relationship.
35. The method of paragraph 34, each of said first color value relationship and said second color value relationship of said potato segment identification color analysis do not utilize said third color value of said given said first pixel.
36. The method of any of paragraphs 34-35, wherein said plurality of color value relationships of said potato segment identification color analysis further comprises a third color value relationship, and wherein said assessing step of said potato segment identification color analysis further comprises assessing said first color value of said given said first pixel, said second color value of said given said first pixel, and said third color value of said given said first pixel against said third color value relationship.
37. The method of paragraph 33, wherein said plurality of color value relationships of said potato segment identification color analysis comprises a first color value relationship and a second color value relationship, wherein said first color value of said given said first pixel is a red color value and said second color value of said given said first pixel is a green color value, wherein said assessing step of said potato segment identification color analysis in relation to a given said first pixel further comprises assessing said red color value of said given said first pixel and said green color value of said given said first pixel against each of said first color value relationship and said second color value relationship.
38. The method of paragraph 37, wherein said third color value of said given said first pixel is a blue color value, and wherein neither said first color value relationship nor said second color value relationship of said potato segment identification color analysis utilizes said blue color value of said given said first pixel.
39. The method of any of paragraphs 37-38, wherein said plurality of color value relationships of said potato segment identification color analysis further comprises a third color value relationship, and wherein said assessing step of said potato segment identification color analysis further comprises assessing said red color value of said given said first pixel, said green color value of said given said first pixel, and said blue color value of said given said first pixel against said third color value relationship.
40. The method of paragraph 39, wherein said first color value relationship is said red color value of said given said first pixel divided by said green color value of said given said first pixel being greater than 0.9, wherein said second color value relationship is said red color value of said given said first pixel divided by said green color value of said given said first pixel being less than 3, and wherein said third color value relationship is a multiple of said blue color value of said given said first pixel being less than a sum of said green color value of said given said first pixel and said red color value of said given said first pixel.
41. The method of paragraph 40, wherein said multiple of said blue color value of said given said first pixel is two times said blue color value of said given said first pixel.
42. A potato segment scoring system comprising said computer, said memory, a processing system comprising at least one processor, and a scoring module configured to execute said potato segment scoring color analysis in accordance with the method of any of paragraphs 1-26 and using said memory and said processing system.
43. A potato segment scoring system comprising said computer, said memory, a processing system comprising at least one processor, a scoring module configured to execute said potato segment scoring color analysis in accordance with the method of any of paragraphs 1-26 and using said memory and said processing system, and an identification module configured to execute said potato segment identification color analysis in accordance with the method of any of paragraphs 30-41 and using said memory and said processing system.

44. The method of any of paragraphs 1-26, wherein a sample comprises a plurality of potato segments, wherein said method is executed in relation to said sample such that said acquiring a color image step is executed for said sample, such that said transmitting step is executed for said color image of said sample, such that said reading step is executed for said color image of said sample, and such that said potato segment scoring color analysis is executed for each said potato segment of said color image.

45. The method of paragraph 44, further comprising using said assigned score of said plurality of potato segments of said sample to determine a selling price for a plurality of potatoes in common storage receptacle from which said sample was acquired.

46. The method of any of paragraphs 1-26, wherein a sample comprises a plurality of potato segments, wherein each said sample is associated with a different time, and wherein said method is separately executed in relation to each said sample such that said acquiring a color image step is executed for each said sample, such that said transmitting step is executed for each said color image, such that said reading step is executed for each said color image, and such that said potato segment scoring color analysis is executed for each said potato segment of each said color image.

47. The method of paragraph 46, further comprising storing information in a separate record in said memory for each said sample.

48. The method of any of paragraphs 46-47, wherein each said sample is from a common storage receptacle comprising a plurality of potatoes.

49. The method of paragraph 48, further comprising using said assigned score for said plurality of potato segments of at least two said samples to determine when to sell said plurality of potatoes in said common storage receptacle.

50. The method of paragraph 48, further comprising using said assigned score for said plurality of potato segments of at least two said samples to adjust at least one condition in said common storage receptacle.

51. The method of any of paragraphs 48-50, further comprising monitoring a condition of said plurality of potatoes in said common storage receptacle, wherein said monitoring step comprises using said assigned score for said plurality of potato segments of at least two said samples.

52. A method for assessing potato segments, comprising the steps of:
disposing a plurality of potato segments on a base, wherein adjacent potato segments of said plurality of potato segments are disposed in spaced relation to one another on said base;
acquiring a color image that comprises said plurality of potato segments and said base, wherein said acquiring a color image step comprises using a camera;
transmitting said color image from said camera to memory that is computer-readable, and thereafter using a computer, operatively connected with said memory, to execute a first color analysis and to thereafter execute a second color analysis;
said first color analysis being based on said color image and comprising:
acquiring a first plurality of color values for each of a plurality of first pixels; and
assessing said first plurality of color values for each said first pixel against a plurality of color value relationships;
identifying each said first pixel whose plurality of color values that satisfies each of said plurality of color value relationships;
using said first pixels from said identifying step of said first color analysis to identify each said potato segment in said color image, wherein each said potato segment in said color image is collectively defined by a different plurality of potato segment pixels in said color image;
said second color analysis being done on each said potato segment in said color image and comprising:
acquiring a second plurality of color values for each said potato segment pixel of said potato segment;
assessing each said potato segment pixel in relation to at least one of a plurality of color value sets, wherein each said color value set has a different color requirement and a different score;
executing a first assigning step comprising assigning each said potato segment pixel to said score for one of said plurality of color value sets and based upon its second plurality of color values complying with said color value requirement of said one of said plurality of color value sets; and
generating an assigned score for said potato segment, wherein said assigned score is said score that has been associated with the largest number of said potato segment pixels by said first assigning step.

53. The method of paragraph 52, wherein each said potato segment is a fried French fry.

54. The method of any of paragraphs 52-53, wherein said base is a tray.

55. The method of any of paragraphs 52-54, wherein said base comprises a plurality of slots that are spaced from one another, and wherein each said potato segment is positioned within a different said slot.

56. The method of paragraph 55, wherein said plurality of slots are disposed in parallel relation to one another.

57. The method of any of paragraphs 52-56, wherein said first color analysis further comprises resizing said color image, wherein said acquiring a first plurality of color values step, said assessing step of said first color analysis, and said identifying step are executed on said color image after said resizing step.

58. The method of any of paragraphs 52-57, wherein said first plurality of different color values comprises a first color value, a second color value, and a third color value.

59. The method of paragraph 58, wherein said plurality of color value relationships of said first color analysis comprises a first color value relationship and a second color value relationship, wherein said assessing step of said first color analysis in relation to a given said first pixel further comprises assessing said first color value of said given said first pixel and said second color value of said given said first pixel against each of said first color value relationship and said second color value relationship.

60. The method of paragraph 59, each of said first color value relationship and said second color value relationship of said first color analysis do not utilize said third color value of said given said first pixel.

61. The method of any of paragraphs 59-60, wherein said plurality of color value relationships of said first color analysis further comprises a third color value relationship, and wherein said assessing step of said first color analysis further comprises assessing said first color value of said given said first pixel, said second color value of said given said first pixel, and said third color value of said given said first pixel against said third color value relationship.

62. The method of paragraph 58, wherein said plurality of color value relationships for said first color analysis comprises a first color value relationship and a second color value relationship, wherein said first color value of said first plurality of color values is a red color value and said second color value of said first plurality of color values is a green color value, wherein said assessing step of said first color analysis in relation to a given said first pixel further comprises assessing said red color value of said given said first pixel and said green color value of said given said first pixel against each of said first color value relationship and said second color value relationship.

63. The method of paragraph 62, wherein said third color value of said first plurality of color values is a blue color value, and wherein neither said first color value relationship nor said second color value relationship of said first color analysis utilizes said blue color value of said given said first pixel.

64. The method of any of paragraphs 62-63, wherein said plurality of color value relationships of said first color analysis further comprises a third color value relationship, and wherein said assessing step of said first color analysis further comprises assessing said red color value of said given said first pixel, said green color value of said given said first pixel, and said blue color value of said given said first pixel against said third color value relationship.

65. The method of paragraph 64, wherein said first color value relationship is said red color value of said given said first pixel divided by said green color value of said given said first pixel being greater than 0.9, wherein said second color value relationship is said red color value of said given said first pixel divided by said green color value of said given said first pixel being less than 3, and wherein said third color value relationship is a multiple of said blue color value of said given said first pixel being less than a sum of said green color value of said given said first pixel and said red color value of said given said first pixel.

66. The method of paragraph 65, wherein said multiple of said blue color value of said given said first pixel is two times said blue color value of said given said first pixel.

67. The method of any of paragraphs 52-66, wherein said second plurality of color values comprises a first color value and a second color value for said potato segment pixel, wherein said first color value for each said potato segment pixel is a red color value and said second color value for each said potato segment pixel is a green color value.

68. The method of any of paragraphs 52-67, wherein each said potato segment pixel is stored as a 32-bit number in said memory by said computer, wherein said first color value of said potato segment pixel is one 8-bit value of said 32-bit number and said second color value of said potato segment pixel is a different 8-bit value of said 32-bit number.

69. The method of any of paragraphs 52-67, wherein each said potato segment pixel is stored as a 32-bit number in said memory by said computer, wherein said first color value of said potato segment pixel is defined by bits 9-16 of said 32-bit number and said second color value of said potato segment pixel is defined by bits 17-24 of said 32-bit number.

70. The method of any of paragraphs 68-69, wherein said computer comprises software that is configured to read said 32-bit number for each said potato segment pixel from said memory and to convert a first corresponding portion of said 32-bit number into said first color value for said potato segment pixel and to convert a second corresponding portion of said 32-bit number into said second color value for said potato segment pixel.

71. The method of any of paragraphs 52-70, wherein said first assigning step of said second color analysis fails to utilize a third color value of said potato segment pixel.

72. The method of paragraph 71, wherein said third color value of said potato segment pixel is a blue color value.

73. The method of any of paragraphs 52-72, wherein said plurality of color value sets includes only five different color value sets.

74. The method of any of paragraphs 52-73, wherein a number of said plurality of color value sets are equated with only five different colors.

75. The method of paragraph 74, wherein said five different colors are red, orange, yellow, yellow/green, and green.

76. The method of any of paragraphs 52-75:

wherein said plurality of color value sets comprises a fourth color value set, a third color value set, a second color value set, a first color value set, and a base color value set;

wherein a given said potato segment pixel is assigned by said first assigning step to said score of said fourth color value set if a fourth determining step is a pass and which requires both said first color value and said second color value of said given said potato segment pixel to comply with said first color value requirement and said second color value requirement, respectively, of said fourth color value set;

wherein a given said potato segment pixel is assigned by said first assigning step to said score of said third color value set if said fourth determining step is a fail and if a third determining step is a pass and which requires both said first color value and said second color value of said given said potato segment pixel to comply with said first color value requirement and said second color value requirement, respectively, of said third color value set;

wherein a given said potato segment pixel is assigned by said first assigning step to said score of said second color value set if said fourth determining step is a fail, if said third determining step is a fail, and if a second determining step is a pass and which requires both said first color value and said second color value of said given said potato segment pixel to comply with said first color value requirement and said second color value requirement, respectively, of said second color value set;

wherein a given said potato segment pixel is assigned by said first assigning step to said score of said first color value set if said fourth determining step is a fail, if said third determining step is a fail, if said second determining step is a fail, and if a first determining step is a pass and which requires both said first color value and said second color value of said given said potato segment pixel to comply with said first color value requirement and said second color value requirement, respectively, of said first color value set; and wherein a given said potato segment pixel is assigned by said first assigning step to said score of said base color value set if said fourth determining step fails, if said third determining step fails, if said second determining step fails, and if said first determining step fails.

77. The method of paragraph 76, wherein:

said first color value requirement of said fourth color value set is a red color value of less than 135 and said second color value requirement of said fourth color value set is a green color value of less than 100;

said first color value requirement of said third color value set is a red color value of less than 170 and said second color value requirement of said third color value set is a green color value of less than 135;

said first color value requirement of said second color value set is a red color value of less than 190 and said second color value requirement of said second color value set is a green color value of less than 160;

said first color value requirement of said first color value set is a red color value of less than 205 and said second color value requirement of said first color value set is a green color value of less than 175.

78. The method of any of paragraphs 76-77, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

79. The method of paragraph 78:

wherein a given said potato segment pixel is displayed in said color of said fourth color value set if said fourth determining step passes;

wherein a given said potato segment pixel is displayed in said color of said third color value set if said fourth determining step fails and if said third determining step passes;

wherein a given said potato segment pixel is displayed in said color of said second color value set if said fourth determining step fails, if said third determining step fails, and if said second determining step passes;

wherein a given said potato segment pixel is displayed in said color of said first color value set if said fourth determining step fails, if said third determining step fails, if said second determining step fails, and if said first determining step passes; and wherein a given said potato segment pixel is displayed in said color of said base color value set if said fourth determining step fails, if said third determining step fails, if said second determining step fails, and if said first determining step fails.

80. The method of paragraph 79, wherein said color of said fourth color value set is red, said color of said third color value set is orange, said color of said second color value set is yellow, said color of said first color value set is yellow/green, and said color of said fourth color value set is green.

81. The method of any of paragraphs 52-75:

wherein said plurality of color value sets comprises a fourth color value set, a third color value set, a second color value set, a first color value set, and a base color value set;

wherein a given said potato segment pixel is assigned by said first assigning step to said score of said fourth color value set if said first color value of said given said potato segment pixel is within a first color value range of said first color value requirement for said fourth color value set and if said second color value of said given said potato segment pixel is within a second color value range of said second color value requirement for said fourth color value set;

wherein a given said potato segment pixel is assigned by said first assigning step to said score of said third color value set if said first color value of said given said potato segment pixel is within a first color value range of said first color value requirement for said third color value set and if said second color value of said given said potato segment pixel is within a second color value range of said second color value requirement for said third color value set;

wherein a given said potato segment pixel is assigned by said first assigning step to said score of said second color value set if said first color value of said given said potato segment pixel is within a first color value range of said first color value requirement for said second color value set and if said second color value of said given said potato segment pixel is within a second color value range of said second color value requirement for said second color value set;

wherein a given said potato segment pixel is assigned by said first assigning step to said score of said first color value set if said first color value of said given said potato segment pixel is within a first color value range of said first color value requirement for said first color value set and if said second color value of said given said potato segment pixel is within a second color value range of said second color value requirement for said first color value set;

wherein a given said potato segment pixel is assigned by said first assigning step to said score of said base color value set if said potato segment pixel is not assigned to said score for any of said first color value set, said second color value set, said third color value set, and said fourth color value set.

82. The method of paragraph 81, wherein:

said first color value range of said fourth color value set is a red color value of less than 135 and said second color value range of said fourth color value set is a green color value of less than 100;

said first color value range of said third color value set is a red color value from 135 to 170 and said second color value range of said third color value set is a green color value from 100 to 135;

said first color value range of said second color value set is a red color value from 170 to 190 and said second color value range of said second color value set is a green color value from 135 to 160;

said first color value range of said first color value set is a red color value from 190 to 205 and said second color value range of said first color value set is a green color value from 160 to 175.

83. The method of any of paragraphs 81-82, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

84. The method of paragraph 83:

wherein a given said potato segment pixel is displayed in said color of said fourth color value set if said first color value of said given said potato segment pixel is within said first color value range of said first color value requirement for said fourth color value set and if said second color value of said given said potato segment pixel is within said second color value range of said second color value requirement for said fourth color value set;

wherein a given said potato segment pixel is displayed in said color of said third color value set if said first color value of said given said potato segment pixel is within said first color value range of said first color value requirement for said third color value set and if said second color value of said given said potato segment pixel is within said second color value range of said second color value requirement for said third color value set;

wherein a given said potato segment pixel is displayed in said color of said second color value set if said first color value of said given said potato segment pixel is within said first color value range of said first color value requirement for said second color value set and if said second color value of said given said potato segment pixel is within said second color value range of said second color value requirement for said second color value set;

wherein a given said potato segment pixel is displayed in said color of said first color value set if said first color value of said given said potato segment pixel is within a first color value range of said first color value requirement for said first color value set and if said second color value of said given said potato segment pixel is within a second color value range of said second color value requirement for said first color value set; and wherein a given said potato segment pixel is displayed in said color of said base color value set if said potato segment pixel is not assigned to said color for any of said first color value set, said second color value set, said third color value set, and said fourth color value set.

85. The method of paragraph 84, wherein said color of said fourth color value set is red, said color of said third color value set is orange, said color of said second color value set is yellow, said color of said first color value set is yellow/green, and said color of said base color value set is green.

86. The method of any of paragraphs 76-85, wherein said score of said fourth color value set is a 4, wherein said score of said third color value set is a 3, wherein said score of said second color value set is a 2, wherein said score of said first color value set is a 1, and wherein said score of said base color value set is a 0.

87. The method of any of paragraphs 52-77, 81, and 82, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

88. The method of any of paragraphs 52-87, further comprising displaying said assigned score for said potato segment.

89. The method of paragraph 88, wherein said displaying step comprises displaying said assigned score on a monitor operatively interconnected with said computer.

90. The method of paragraph 88, wherein said displaying step comprises displaying said assigned score on a hard-copy report.

91. A potato segment scoring system comprising said computer, said memory, a processing system comprising at least one processor, a scoring module configured to execute said first color analysis in accordance with the method of any of paragraphs 52-90 and using said memory and said processing system, and an identification module configured to execute said second color analysis in accordance with the method of any of paragraphs 52-90 and using said memory and said processing system.

92. The method of any of paragraphs 52-91, further comprising using said assigned score said plurality of potato segments to determine a selling price for a plurality of potatoes in common storage receptacle from which said sample was acquired.

93. The method of any of paragraphs 52-91, wherein a sample comprises a plurality of potato segments, wherein each said sample is associated with a different time, and wherein said method is separately executed in relation to each said sample such that said acquiring a color image step is executed for each said sample, such that said transmitting step is executed for each said color image, such that said reading step is executed for each said color image, and such that said potato segment scoring color analysis is executed for each said potato segment of each said color image.

94. The method of paragraph 93, further comprising storing information in a separate record in said memory for each said sample.

95. The method of any of paragraphs 93-94, wherein each said sample is from a common storage receptacle comprising a plurality of potatoes.

96. The method of paragraph 95, further comprising using said assigned score for said plurality of potato segments of at least two said samples to determine when to sell said plurality of potatoes in said common storage receptacle.

97. The method of paragraph 95, further comprising using said assigned score for said plurality of potato segments of at least two said samples to adjust at least one condition in said common storage receptacle.

98. The method of any of paragraphs 96-97, further comprising monitoring a condition of said plurality of potatoes in said common storage receptacle, wherein said monitoring step comprises using said assigned score for said plurality of potato segments of at least two said samples.

DETAILED DESCRIPTION

Figure 1:
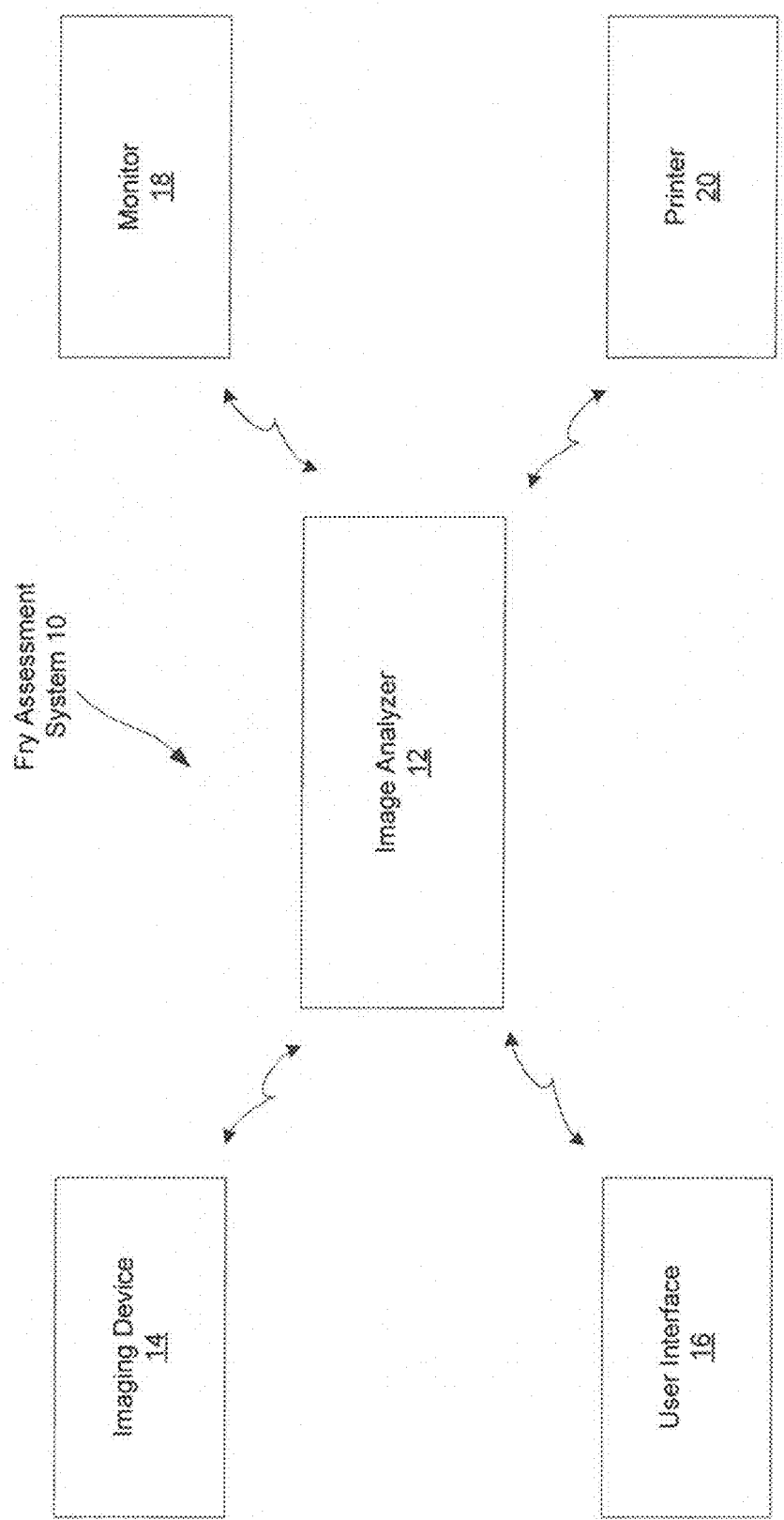
FIG. 1 is a block diagram of one embodiment of a fry assessment system.

One embodiment of a potato product assessment system is illustrated in FIG. 1 and is identified by reference numeral 10. A "potato product" is one that is derived from a potato, including where multiple potato products may be derived from a single potato. Examples presented herein are for a potato product in the form a fry (e.g., French fry), and therefore the potato product assessment system may also be referred to herein as a fry assessment system 10. However, the system 10 may be applicable to a variety of different potato products.

The fry assessment system 10 includes an image analyzer 12, an imaging device 14 of any appropriate type (e.g., a camera, alone or in combination with a light box; e.g., a Canon Rebel EOS T61; using a single camera/light box may be appropriate from a consistency standpoint when analyzing potato products over time; using a light box may facilitate an appropriate pixel brightness and overall image quality for purposes of the assessment(s) addressed herein), at least one user interface 16 (e.g., a keyboard, a mouse, voice recognition software/devices, a touchscreen; for inputting one or more parameters used by the image analyzer 12 to process an output (e.g., image file) from the imaging device 14), typically at least one monitor 18, and typically at least one printer 20. The image analyzer 12 may be operatively interconnected in any appropriate manner with each of the imaging device 14, the user interface(s) 16, the monitor(s) 18, and the printer(s) 20. By way of initial summary, the imaging device 14 acquires a color image of one or more fries, and this color image is transmitted to the image analyzer 12 in any appropriate manner (e.g., via an active communication link between the imaging device 14 and the image analyzer 12; using removable memory such as a thumb drive or the like). The image analyzer 12 processes the color image in accordance with predefined parameters and determines a score for each of the fries included in the color image. The score for each of the fries included in the color image may be displayed on the monitor 18, may be presented on an output from the printer 20, may be stored by the image analyzer 12, or any combination thereof.

Figure 2:
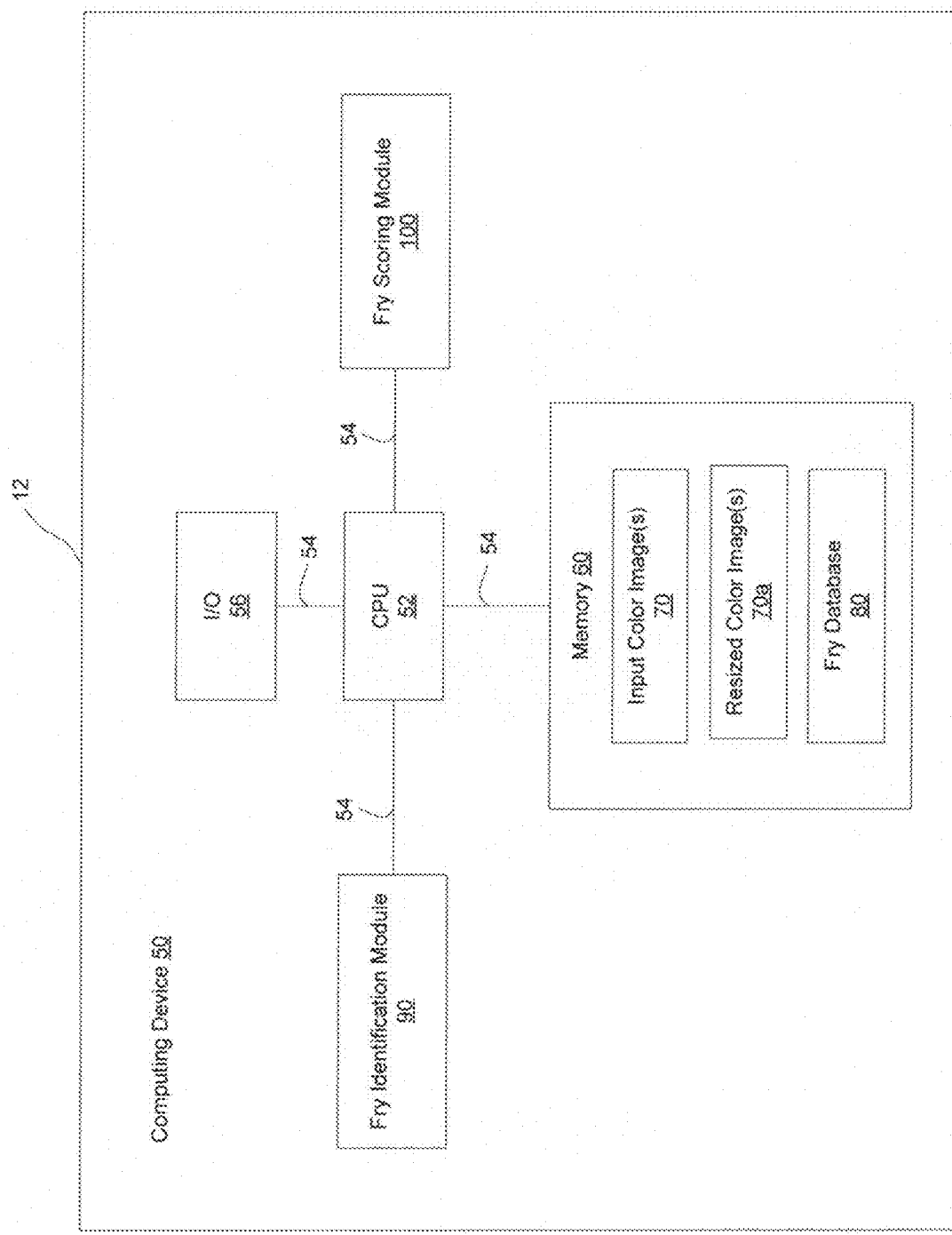
FIG. 2 is a block diagram of a computer that is configured to function as an image analyzer for the fry assessment system of FIG. 1.

FIG. 2 illustrates one embodiment of a computer/computing device that is identified by reference numeral 50 and that is configured to function as the image analyzer 12 for the fry assessment system 10 of FIG. 1. As such, the image analyzer of FIG. 1 may also be referred to herein as an "image analyzer 12/50." The computer 50 may be in the form of a laptop, a desktop, a tablet, or the like, and furthermore may be an autonomous/standalone unit or may be multiple units that are networked/communicate in any appropriate fashion. A central processing unit 52 is utilized by the computer 50 and includes one or more processors or microprocessors of any appropriate type and utilizing any appropriate processing architecture (e.g., a processing system). Other components of the computer 50 include one or more input/output (I/O) devices 56 (e.g., user interface 16 for the fry assessment system 10 of FIG. 1; a monitor(s) 18 for the fry assessment system 10 of FIG. 1), memory 60, a fry identification module 90, and a fry scoring module 100. Although a Windows operating system may be used by the computer 50, other operating systems may be appropriate as well.

The memory 60 for the image analyzer 12/50 may be local, remote, or both, and may be in any appropriate form that is computer-readable. One or more color images 70 from the image device 14 may be stored in the memory 60 (e.g., for image processing), one or more resized color images 70a may be stored in the memory 60 (e.g., for image processing), and a fry database 80 may be stored in the memory 60. Each color image 70 and each resized image 70 may be of any appropriate image format, for instance in the form of a JPEG image.

Communications between various components of the image analyzer 12/50 utilize a bus 54 of any appropriate type and any appropriate communications protocol. One or more parameters used by the fry identification module 90, as well as one or more parameters used by the fry scoring module 100, may be input through an input/output device 56 in the form of the user interface 16 for the fry assessment system 10 of FIG. 1 (e.g., at least certain aspects of both the fry identification module 90 and the fry scoring module 100 may be re-configurable/programmable). Generally, the central processing unit 52 executes code or instructions stored in memory by/for the fry identification module 90 to identify the fries in a resized color image 70a that is stored in the memory 60, which is then used to identify the same fries in the corresponding full-size color image 70 that is also stored in the memory 60. Thereafter, the central processing unit 52 executes code or instructions stored in memory by/for the fry scoring module 100 to determine a score for each of the identified fries in the color image 70 that is stored in the memory 60. These scores, as well as other information discussed in more detail below, may be stored in the fry database 80 of the memory 60. The scores provided fry scoring module 100 may be in accordance with USDA requirements. In this regard, a "0" score from the fry scoring module 100 may encompass each of the "000," "00," and "0" USDA fry color scores, while the scores "1," "2," "3," and "4" from the fry scoring module 100 may correspond with the similarly identified USDA fry color scores. Other types of scores could be utilized by the fry scoring module 100.

Figure 3:
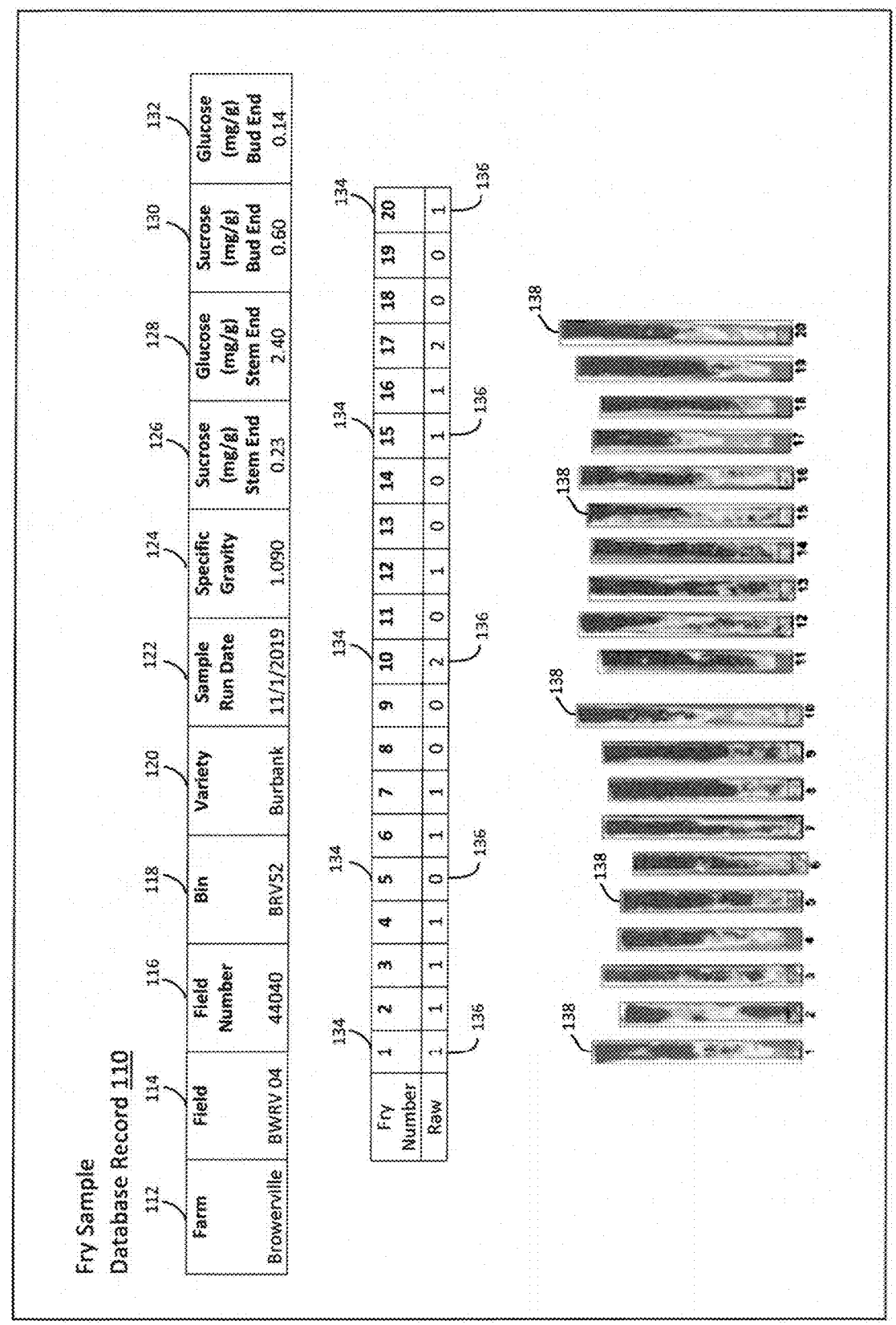
FIG. 3 is a diagram of one embodiment of a fry sample database record for a fry database used by the image analyzer of FIG. 2.

The fry database 80 in the memory 60 of the image analyzer 12/50 may be of any appropriate configuration. FIG. 3 illustrates one embodiment of a fry sample database record 110 that may be included in the fry database 80. The fry sample database record 110 is configured to store various information on/pertaining to the group of fries that are included in a color image 70 that is provided to the computer 52 for image processing/analysis and that will be discussed in more detail below (i.e., a "sample" includes a plurality of fries). In one embodiment, four fries are acquired from a potato (e.g., sliced) for analysis/testing, with two of the fries being used for a sugar analysis and with the remaining two fries being used for imaging analysis by the fry assessment system 10. One of the fries may be blanched (e.g., heated at a certain temperature and for a certain period of time, for instance disposing the fry in boiling water at a temperature of 175° F. for 10 minutes) and is thereafter fried in oil (e.g., at a certain temperature and for a certain period of time, for instance at a temperature of 375° F. for 3 minutes). Another of the fries is not subject to blanching (i.e., a raw fry), but is fried in oil (e.g., at a certain temperature and for a certain period of time, for instance at a temperature of 375° F. for 3 minutes). All fries in a common color image 70 typically will be blanched and fried, or will be raw and fried (i.e., it would be preferable for a given fry sample database record 110 to have all blanched and fried fries, or to have all raw and fried fries).

The following database fields may be included for each fry sample database record 110 within the fry database 80: a database field 112 (e.g., for storing information that identifies a particular farm from which potatoes were harvested and from which the analyzed fries were acquired); a database field 114 (e.g., for storing information that identifies a particular agricultural field within a particular farm from which potatoes were harvested and from which the analyzed fries were acquired); a database field 116 (e.g., for storing a unique number that identifies a particular agricultural field, as a number of agricultural fields could have the same identifier in their corresponding database field 114); a database field 118 (e.g., for storing information that identifies a particular bin or other storage structure (such as a warehouse that can store up to several tons of potatoes) from which potatoes were removed and from which the analyzed fries were acquired); a database field 120 (e.g., for storing information that identifies the variety of the potatoes from which the analyzed fries were acquired); a database field 122 (e.g., for storing information that identifies the date on which the fries were analyzed by the fry assessment system 10); a database field 124 (e.g., for storing information on the specific gravity of the potatoes from which the analyzed fries were acquired); a database field 126 (e.g., for storing information on the sucrose level of the stem end of the potatoes from which the analyzed fries were acquired); a database field 128 (e.g. for storing information on the glucose level of the stem end of the potatoes from which the analyzed fries were acquired); a database field 130 (e.g. for storing information on the sucrose level of the bud end of the potatoes from which the analyzed fries were acquired); and a database field 132 (e.g. for storing information on the glucose level of the bud end of the potatoes from which the analyzed fries were acquired).

The fry sample database record 110 further includes a plurality of database fields 134 for purposes of separately identifying each fry that is included in the color image 70 that is processed by the image analyzer 12/50 using both the fry identification module 90 and the fry scoring module 100. The results provided by the fry scoring module 100 are stored in conjunction with the corresponding fry in a database field 136 of the fry sample database record 110. As will be discussed in more detail below, each fry is scored as either a 0, 1, 2, 3, or 4 (the lower the score, the higher the quality of the potato from which the fry was derived).

Figure 3A:
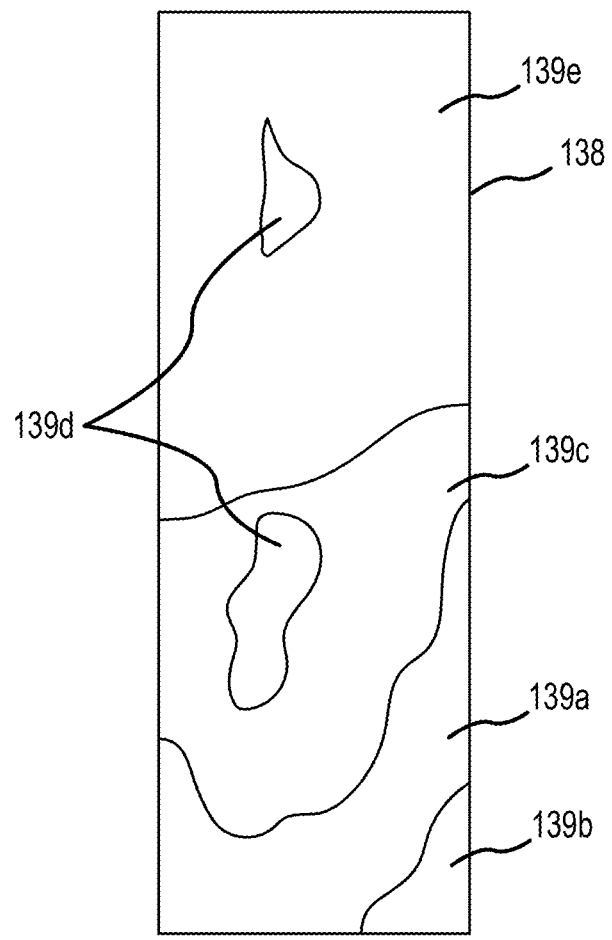
FIG. 3A is a line drawing (top view) of a representative colored score image of a fry.

Colored score images 138 (FIG. 3) for each of the fries in a color image 170 processed by the image analyzer 12/50 may also be stored in a fry sample database record 110 and will be discussed in more detail below. FIG. 3A is a line drawing (top view) of a representative colored score image 138 of a fry that could be included in the noted color image 170. In any case, each colored score image 138 may include any appropriate number of different colors and distributed in various different arrangements depending upon the characteristics of the given fry. FIG. 3A shows a score image 138 of a fry with one or more regions in 5 different colors (region 139a (e.g., red); region 139b (e.g., orange); region 139c (e.g., yellow); region 139d (e.g., yellow/green); region 139e (e.g., green)).

Figure 4:
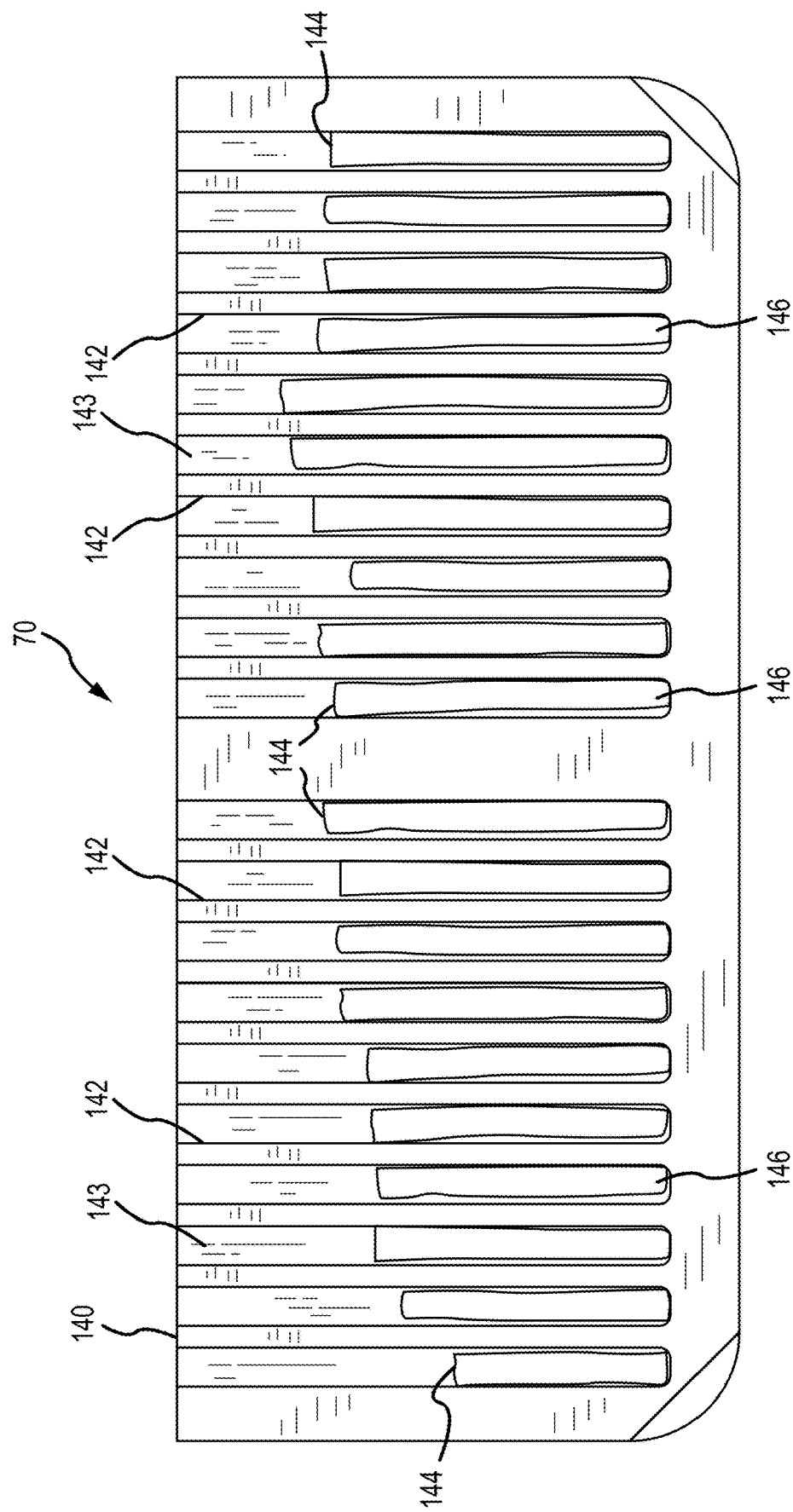
FIG. 4 is a top view of French fries disposed on a tray for assessment by a fry assessment module and a fry scoring module used by the image analyzer of FIG. 2.

An embodiment of a color image 70 that may be processed by the image analyzer 12/50 is illustrated in FIG. 4 and for purposes of discussing the fry identification module 90 and the fry scoring module 100 of the fry assessment system 10. A base or tray 140 includes a plurality of grooves or slots 142 for receipt of a corresponding fry 144 (each slot 142 including a bottom wall 143 that is recessed relative to an upper surface of the base 140—a fry 144 being disposable on the bottom wall 143 of one or more of the slots 142). The slots 142 are disposed in at least substantially parallel relation to one another for the illustrated embodiment, although other arrangements may be appropriate. Any appropriate number of slots 142 may be utilized for the tray 140 (20 in the illustrated embodiment). The perimeter of each fry 144 is defined by four faces 146, where adjacent pairs of faces 146 intersect with one another. The image processing provided by the fry identification module 90 and the fry scoring module 100 may be based upon information acquired from at least one face 146 of each fry 144 in the tray 140 (at the "upper" face in the view presented in FIG. 4). Although the tray 140 is blue in the illustrated embodiment, other colors may be appropriate (although one or more changes may need to be made to the fry assessment system 10 (e.g., one or more values used by the fry identification module 90, the fry scoring module 100, or both)). Preferably, the tray 140 is of a significantly different color than the fries 144 being analyzed by the fry assessment system 10.

Figure 5:
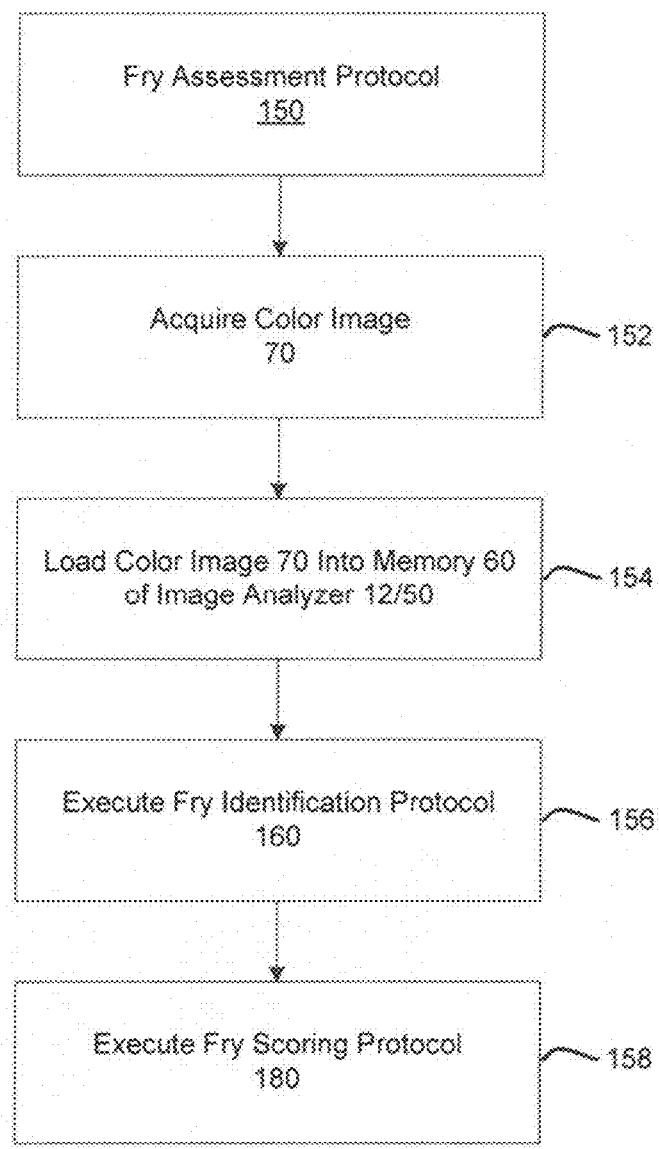
FIG. 5 is one embodiment of a fry assessment protocol that may be used by the image analyzer of FIG. 2.

One embodiment of a fry assessment protocol is illustrated in FIG. 5, is identified by reference numeral 150, and may be used by the fry assessment system 10 of FIG. 1. The imaging device 14 (FIG. 1) acquires a color image 70 that includes any appropriate number of fries (step 152). This color image 70 may be in accordance with the discussion presented above on FIG. 4, where each fry 144 is disposed in an individual slot 142 of the tray 140. In any case, this color image 70 is stored in the memory 60 of the image analyzer 12/50 (step 154). This may be done in any appropriate manner, for instance by a direct communication link between the imaging device 14 and the image analyzer 12/50, by using removable memory, or the like. Thereafter, a fry identification protocol 160 (FIG. 6) is executed by the fry identification module 90 (FIG. 2) to identify each individual fry 144 in the color image 70 (step 156). Once the individual fries 144 have been identified in the color image 70, a fry scoring protocol 180 (FIG. 7) is executed by the fry scoring module 100 (FIG. 2) to generate a separate score for each of the fries 144 (step 158).

Both the fry identification protocol 160 (FIG. 6; step 156 of the fry assessment protocol 150 of FIG. 5) and the fry scoring protocol 180 (FIG. 7; step 158 of the fry assessment protocol 150 of FIG. 5) utilize multiple color values of multiple pixels of an image file that may include multiple fries 144. When the color image 70 is saved in the memory 60 of the image analyzer 12/50, it is automatically broken down into pixels. Each pixel is then stored in the memory 60 as a 32-bit number. This 32-bit number represents the Alpha, Red, Green, Blue (ARGB) value or color of the pixel in the color image 70. Each piece of the ARGB value is represented in 8-bits of the 32-bit saved value: the first 8-bits of the 32-bit value is the alpha value; the next 8-bits are the red value (or red color value); the next 8-bits are the green value (or green color value), and the last 8-bits are the blue value (or blue color value) of the corresponding pixel. Each 8-bit value corresponds to a numeric value between 0 and 255 that represents the intensity of color in the pixel, with 0 being transparent and 255 being fully opaque (and that may be generated through execution of the fry assessment protocol 150 of FIG. 5 (more specifically by the fry identification protocol 160 of FIG. 6 regarding a resized color image 70a and by the fry scoring protocol 180 of FIG. 7 regarding the full-size color image 70)). In the case of an ARGB value, A or alpha represents overall transparency/opaqueness of a pixel, while R or red, G or green, and B or blue are the opaqueness of each color needed to re-create the overall color of the pixel.

Both the fry identification protocol 160 and the fry scoring protocol 180 are based upon image/color analysis. The images that are processed by the fry identification protocol 160 and the fry scoring protocol 180 may be stored in the memory 60 of the image analyzer 12/50 of the fry assessment system 10 in the form of a bitmap. Such a bitmap includes a plurality of rows of pixels and columns of pixels. The pixel evaluations by the fry identification protocol 160 and the fry scoring protocol 180 may be undertaken on a row-by-row basis of this bitmap (e.g., from left-to-right within a given row), starting with row one of the bitmap and thereafter proceeding to row 2 of the bitmap, then row 3 of the bitmap, and so forth. However, the scanning of the bitmap could be undertaken on any appropriate basis for purposes of both the fry identification protocol 160 and the fry scoring protocol 180 in relation to retrieving color values for individual pixels.

Figure 6:
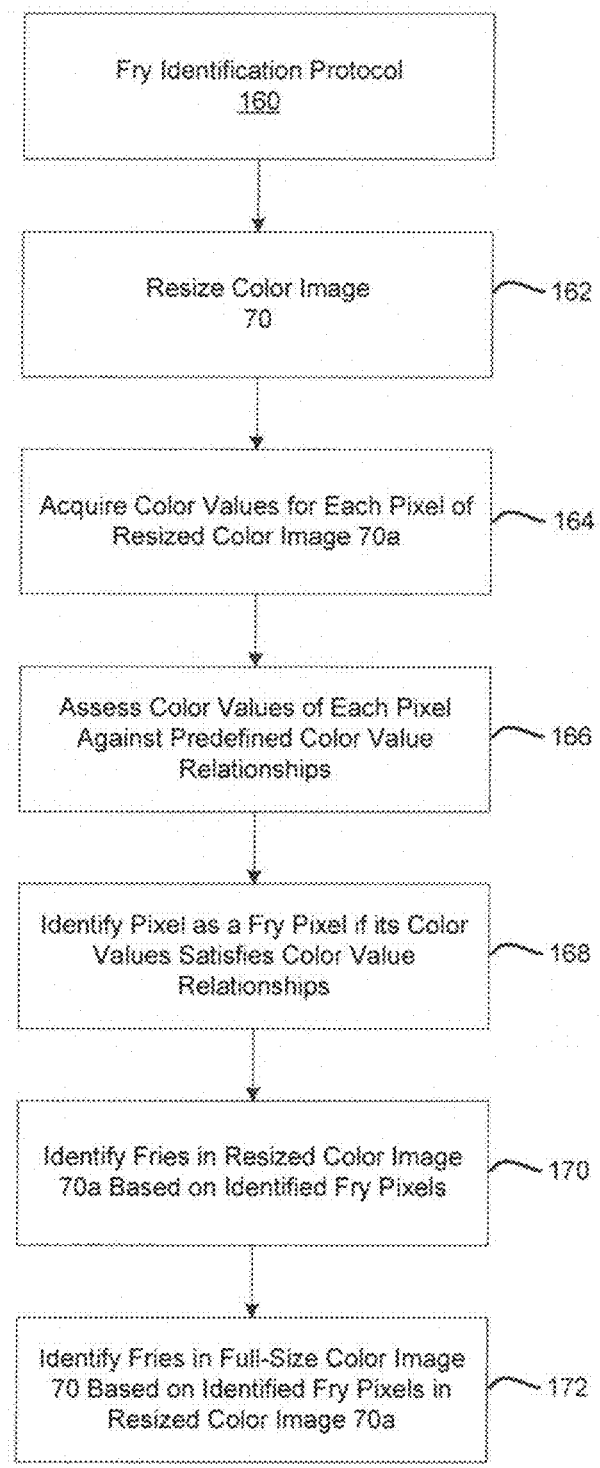
FIG. 6 is one embodiment of a fry identification protocol that may be used by the fry identification module of the image analyzer of FIG. 2.

One embodiment of a fry identification protocol is illustrated in FIG. 6, is identified by reference numeral 160, and may be utilized by the fry identification module 90 (FIG. 2) of the image analyzer 12/50 for the fry assessment system 10 (FIG. 1). The color image 70 to be processed by the fry identification module 90 is resized pursuant to step 162 of the fry identification protocol 160. Generally, each pixel in the resized color image 70a corresponds with multiple pixels in the full-size color image 70. Therefore, the processing requirements for fry identification by the fry identification protocol 160 are reduced by resizing the color image 70 pursuant to the execution of step 162. However, the full-size color image 170 could instead be processed by the fry identification protocol 160 (references to "resized color image 70a" or the like in FIG. 6 could then simply be changed to "color image 70" or the like).

Multiple color values are acquired for each pixel of the resized color image 70a pursuant to step 164 of the fry identification protocol 160. One embodiment has a red color value, a green color value, and a blue color value being acquired for each pixel of the resized color image 70a pursuant to step 164. Multiple color values for each pixel of the resized color image 70a are assessed against what may be characterized as a plurality of predefined color value relationships (e.g., the color value relationships for step 166 may be configured through the user interface 16 of the fry assessment system 10 of FIG. 1). One embodiment has step 166 using three different color value relationships—a first color value relationship, a second color value relationship, and a third color value relationship. In one embodiment and for each pixel of the resized color image 70a: 1) the first color value relationship is that the red color value divided by the green color value for a given pixel must be greater than 0.9 (i.e., R/G>0.9); 2) the second color value relationship is that the red color value divided by the green color value for this same pixel must be less than 3 (i.e., R/G<3); and 3) the third color value relationship is that the blue color value, multiplied by 2, must be less than the sum of the green color value and the red color value [i.e., (2×B)<(G+R)]. The actual values for these three color value relationships may be dependent upon the imaging device 14 for the fry assessment system 10 (FIG. 1).

If the color values of a given pixel of the resized color image 70a satisfy or comply with each of the color value relationships required by step 166, step 168 of the fry identification protocol 160 identifies this pixel as a "fry pixel", meaning that the pixel has been determined by the fry identification protocol 160 to define part of one of the fries 144 in the resized color image 70a. Once all of the fry pixels have been identified in the resized color image 70a (e.g., steps 164, 166, and 168), this information may be used to identify all of the individual fries 144 in the resized color image 70a (step 170) and in any appropriate manner. For instance, if adjacent fry pixels satisfy a proximity function, the adjacent fry pixels may be characterized as being part of a common fry 144. Once all of the fry pixels in the resized color image 70a that define a particular fry 144 in the resized color image 70a have been identified through step 170 of the fry identification protocol 160, this can be used to identify all of the pixels in the full-size color image 70 that define this same fry 144 (step 172). For instance, the identity of the pixels from the full-size color image 70 that define each individual pixel in the resized color image 70 may be retained in the memory 60 for purposes of execution of step 172. Therefore, step 172 also may be characterized as using an output of step 170 to identify all fry pixels in the full-size color image 70.

Figure 7:
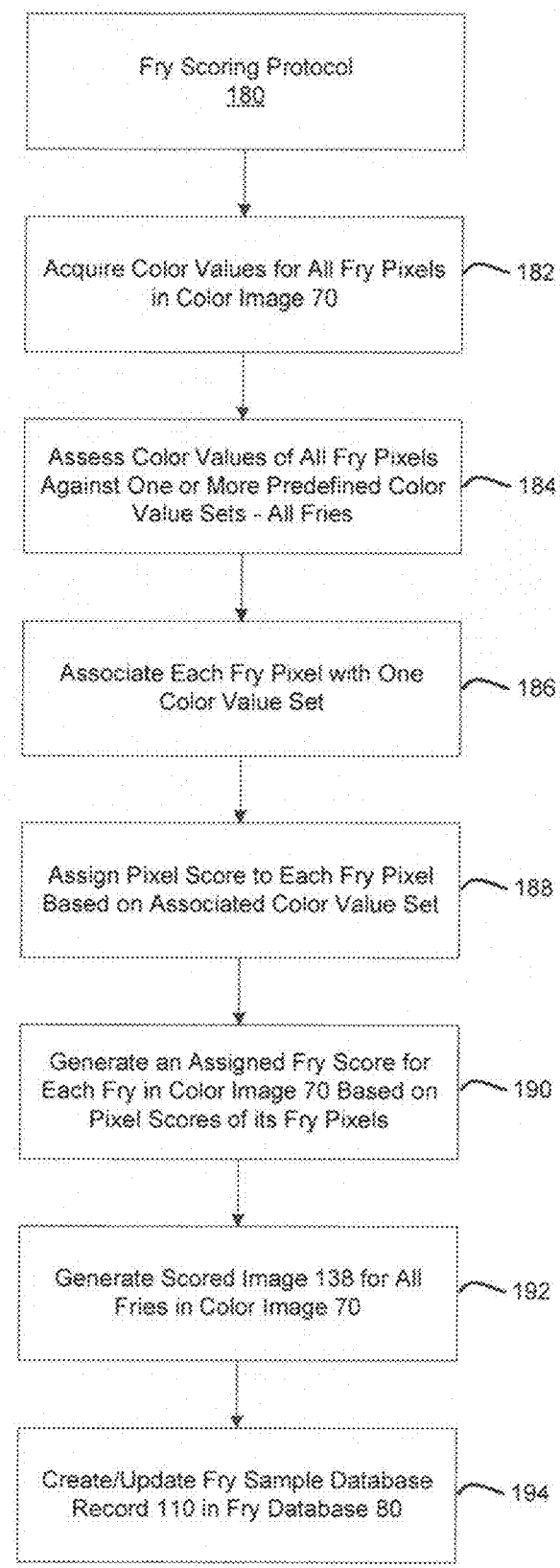
FIG. 7 is one embodiment of a fry scoring protocol that may be used by the fry scoring module of the image analyzer of FIG. 2.
Figure 8:
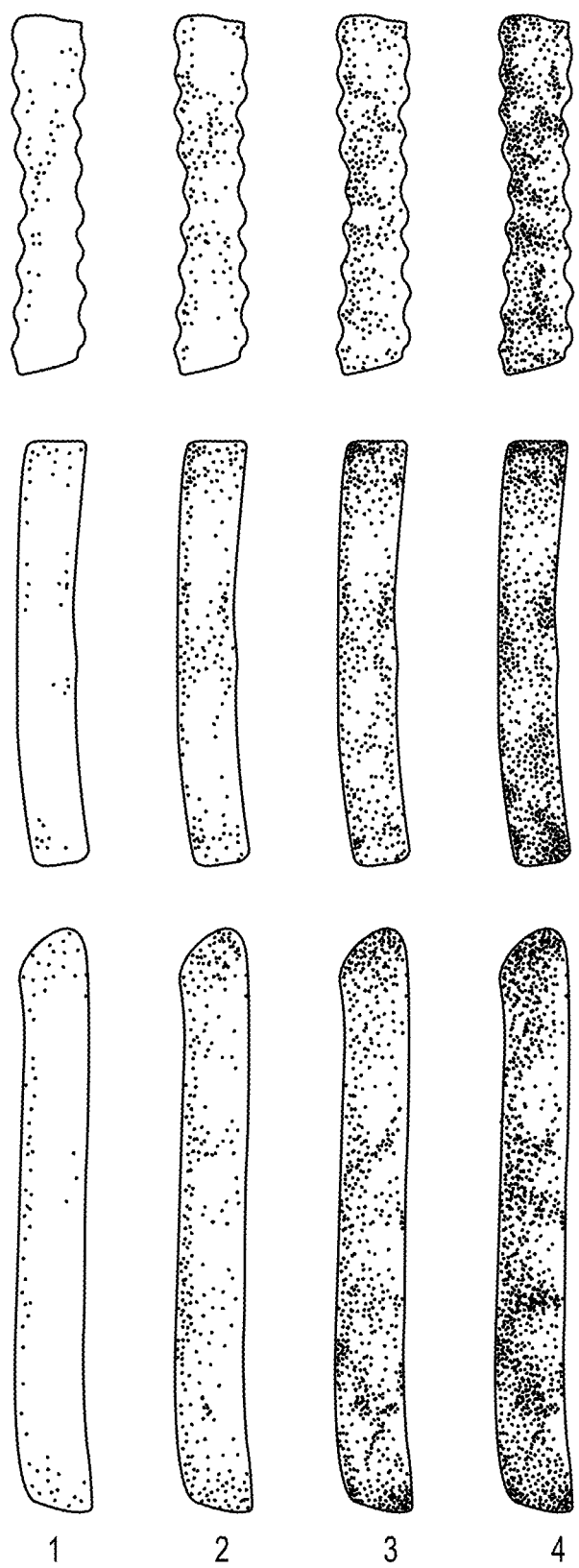
FIG. 8 is a prior art, color-based scoring guide in accordance with USDA requirements.

One embodiment of a fry scoring protocol is illustrated in FIG. 7, is identified by reference numeral 180, and may be utilized by the fry scoring module 100 (FIG. 2) of the image analyzer 12/50 for the fry assessment system 10 (FIG. 1). Multiple color values are acquired for each fry pixel of the full-size color image 70 pursuant to step 182 of the fry scoring protocol 180. The pixels for which color values are acquired pursuant to step 182 are those pixels that have been identified as being part of a fry 144 pursuant to the fry identification protocol 160 of FIG. 6. One embodiment has at least a red color value and a green color value being acquired for each fry pixel of the color image 70 pursuant to step 182. That is, both a red color value and a green color value are acquired for all of the pixels in relation to each of the fries 144 in the full-size color image 70 pursuant to step 182. Although a blue color value could also be acquired for all of the pixels in relation to each of the fries 144 in the full-size color image 70 pursuant to step 182, these blue color values are not used to generate a pixel score for these pixels in the illustrated embodiment of the fry scoring protocol 180.

Multiple color values for each pixel in the full-sized color image 70 that has been identified as being part of a fry 144 in the color image 70 are assessed (step 184) against what may be characterized one or more of a plurality of predefined color value sets (e.g., the color value sets for step 184 may be configured through the user interface 16 of the fry assessment system 10 of FIG. 1). Any appropriate number of color value sets may be utilized for purposes of step 184. Each of the color value sets has at least two different color value requirements (e.g., a first color value requirement and a second color value requirement), an assigned score, and an assigned color. One embodiment has step 184 using five different color value sets and with each having a first color value requirement, a second color value requirement, an assigned color, and an assigned score—a base color value set, a first color value set, a second color value set, a third color value set, and a fourth color value set. In this regard and for the noted embodiment (the actual color values for the following color value sets may be dependent upon the imaging device 14 for the fry assessment system 10 (FIG. 1)): 1) the first color value requirement of the fourth color value set is a red color value of less than 135, the second color value requirement of the fourth color value set is a green color value of less than 100, the assigned color is "red," and the assigned score is "4"; 2) the first color value requirement of the third color value set is a red color value of less than 170, the second color value requirement of the third color value set is a green color value of less than 135, the assigned color is "orange," and the assigned score is "3"; 3) the first color value requirement of the second color value set is a red color value of less than 190, the second color value requirement of the second color value set is a green color value of less than 160, the assigned color is "yellow," and the assigned score is "2"; 4) the first color value requirement of the first color value set is a red color value of less than 205, the second color value requirement of the first color value set is a green color value of less than 175, the assigned color is "yellow/green," and the assigned score is "1"; and 5) the base color value set is for all red color value and green color value combinations that do not comply with both the first color value requirement and the second color value requirement of any of the first color value set, the second color value set, the third color value set, and the fourth color value set, where the assigned color for the base color set is "green," and the assigned score for the base color set is "0." This can be summarized by the following table, where the "RGB Value" column corresponds with the noted color value sets:

| RGB Value | Color Assigned | Score Assigned |
| --- | --- | --- |
| R < 135 & G < 100 (B is ignored) | Red | 4 |
| R < 170 & G < 135 (B is ignored) | Orange | 3 |
| R < 190 & G < 160 (B is ignored) | Yellow | 2 |
| R < 205 & G < 175 (B is ignored) | Yellow/Green | 1 |
| Any other RGB combination | Green | 0 |

Step 186 of the fry scoring protocol 180 associates each fry pixel in the full-size color image 70 with one color value set from step 184. One way of configuring steps 184 and/or 186 to associate each fry pixel in the full-size color image 170 with one color value set is as follows: 1) a fry pixel is associated with the fourth color value set if a fourth determining step is a pass and which requires the first color value and the second color value of this fry pixel to comply with the first color value requirement and the second color value requirement, respectively, of the fourth color value set; 2) a fry pixel is associated with the third color value set if the fourth determining step is a fail and if a third determining step is a pass and which requires the first color value and the second color value of this fry pixel to comply with the first color value requirement and the second color value requirement, respectively, of the third color value set; 3) a fry pixel is associated with the second color value set if the fourth determining step is a fail, if the third determining step is a fail, and if a second determining step is a pass and which requires the first color value and the second color value of this fry pixel to comply with the first color value requirement and the second color value requirement, respectively, of the second color value set; 4) a fry pixel is associated with the first color value set if the fourth determining step is a fail, if the third determining step is a fail, if the second determining step is a fail, and if a first determining step is a pass and which requires the first color value and the second color value of this fry pixel to comply with first color value requirement and the second color value requirement, respectively, of the first color value set; and 5) a fry pixel is associated with the base color value set if the fourth determining step fails, if the third determining step fails, if the second determining step fails, and if the first determining step fails. One way in which this may be implemented is for the fourth determining step to be executed, followed by the third determining step, followed by the second determining step, and then followed by the first determining step in accordance with the foregoing.

Another way of configuring steps 184 and/or 186 to associate each fry pixel in the full-size color image 70 with one color value set entails having the first color value requirement and the second color value requirement for each of the color value sets be in the form of a first color value range and a second color value range, respectively. In this regard and for each fry pixel: 1) a fry pixel is associated with the fourth color value set if the first color value of the fry pixel is within a first color value range for the fourth color value set and if the second color value of the same fry pixel is within a second color value range of the fourth color value set; 2) a fry pixel is associated with the third color value set if the first color value of the fry pixel is within a first color value range of the third color value set and if the second color value of the same fry pixel is within a second color value range of the third color value set; 3) a fry pixel is associated with the second color value set if the first color value the fry pixel is within a first color value range of the second color value set and if the second color value of the same fry pixel is within a second color value range of the second color value set; 4) a fry pixel is associated with the first color value set if the first color value of the fry pixel is within a first color value range of the first color value set and if the second color value of the same fry pixel is within a second color value range of the first color value set; and 5) a fry pixel is associated with the base color value set if the fry pixel is not associated with any of the first color value set, the second color value set, the third color value set, and the fourth color value set. Steps 184 and/or 186 may be configured to utilize any order for purposes of determining if a given fry pixel can be associated with one of the first color value set, the second color value set, the third color value set, or the fourth color value set. Moreover and in one embodiment: 1) the first color value range of the fourth color value set is a red color value of less than 135 and the second color value range of the fourth color value set is a green color value of less than 100; 2) the first color value range of the third color value set is a red color value from 135 to 170 and the second color value range of the third color value set is a green color value from 100 to 135; 3) the first color value range of the second color value set is a red color value from 170 to 190 and the second color value range of the second color value set is a green color value from 135 to 160; 4) the first color value range of the first color value set is a red color value from 190 to 205 and the second color value range of the first color value set is a green color value from 160 to 175.

One objective of steps 184 and 186 is to determine the pixel score that should be assigned to each fry pixel in the full-size color image 70 (again, a fry pixel being a pixel that is part of an individual fry 144 in the color image 70). Steps 184 and 186 may be configured in any appropriate manner to accomplish this objective. For instance, step 188 is directed to assigning a pixel score to a given fry pixel based on the color value set that has been associated with the fry pixel pursuant to steps 184 and 186, and this is done for each fry pixel in the full-size color image 70. An assigned fry score is generated for each fry 144 in the full-size color image 70 based on the pixel scores of its corresponding fry pixels (step 190). In one embodiment, the assigned fry score for each fry 144 in the full-size color image 70 corresponds with the pixel score of the largest number of pixels in the fry 144. Stated another way, the assigned fry score for step 190 is the pixel score (steps 184 and 186) having the highest percentage of pixels in the fry 144 (step 190). As an example, if 34% of the fry pixels of a particular fry 144 in the color image 70 were determined to have a pixel score of 2, if 42% of the fry pixels of this same fry 144 in the color image 70 were determined to have a pixel score of 0, and if 24% of the fry pixels of this same fry 144 in the color image 70 were determined to have a pixel score of 3 (all pursuant to steps 184, 186, and 188), the assigned fry score for this particular fry 144 in the color image 70 would be a "0" pursuant to step 190. The assigned fry score (step 190) could be displayed on a monitor 18 of the fry assessment system 19 (FIG. 1), could be included in a printout from the printer 20 of the fry assessment system 19 (FIG. 1), or both. Moreover, the assigned fry scores from step 190 are stored in the corresponding database record 110 in the database 80. Potential uses of the assigned fry scores will be discussed in more detail below.

Another objective of steps 184 and 186 is to determine the pixel color that should be assigned to each fry pixel in the full-size color image 70. A scored image 138 (FIG. 3) of each fry 144 in the color image 70 may be generated from its corresponding fry pixels, where each fry pixel is displayed in the pixel color of the associated color value set. Therefore and for each fry pixel of a fry 144 in the color image 70: 1) if a fry pixel is associated with the fourth color value set (steps 184 and 186), this fry pixel is displayed in the scored image 138 in the assigned color for the fourth color value set; 2) if a fry pixel is associated with the third color value set (steps 184 and 186), this fry pixel is displayed in the scored image 138 in the assigned color for the third color value set; 3) if a fry pixel is associated with the second color value set (steps 184 and 186), this fry pixel is displayed in the scored image 138 in the assigned color for the second color value set; 4) if a fry pixel is associated with the first color value set (steps 184 and 186), this fry pixel is displayed in the scored image 138 in the assigned color for the first color value set; and 5) if a fry pixel is associated with the base color value set (steps 184 and 186), this fry pixel is displayed in the scored image 138 in the assigned color for the base color value set. The assigned color for each fry pixel could be displayed on a monitor 18 of the fry assessment system 19 (FIG. 1), could be included in a printout from the printer 20 of the fry assessment system 19 (FIG. 1), or both. Moreover, the scored images 138 from step 192 may be stored in the corresponding database record 110 in the database 80.

A fry sample database record 110 (FIG. 3) in the fry database 80 (FIG. 2) may be created or updated based upon the results of fry scoring protocol 180 pursuant to step 194. For instance, the assigned score for each fry 144 in the color image 70 may be stored in a corresponding fry sample database record 110, a scored image 138 for each fry 144 in the color image 70 may be stored in a corresponding fry sample database record 110, or both. Moreover, a composite score may be assigned to the collection of fries 144 in the color image 70 for purposes of its corresponding fry sample database record 110, and which may be the sum of the individual scores for each of the fries in the same color image 70. The percentage of fries having a score of "0" or "1" could also be stored in the fry sample database record 110.

The score assigned to each fry 144 of a color image 70 pursuant to the fry scoring protocol 180 may be used for any appropriate purpose. Each fry 144 in a common color image 70 may come from a common bin, warehouse, or other storage receptacle/facility for potatoes (database field 118 of the fry sample database record 110 of FIG. 3). The assigned fry score for each fry 144 in the same color image 70 may be used to generate a composite score that is associated with each of the potatoes in this common bin.

A sample may include a plurality of fries. Each sample may be acquired from a common bin, warehouse, or other storage receptacle/facility for potatoes. The fries 144 of each sample may be separately scored by the image analyzer 12/50 in accordance with the foregoing, and results on each sample may be stored in a corresponding database record 110 in the database 80 in accordance with the foregoing. Samples may be acquired from the common bin on any appropriate timing basis (e.g., monthly). The scores of fries 144 of at least one of the samples may be used for one or more of: 1) determining a selling price for the potatoes in this common bin; and 2) justifying a selling price for the potatoes in this common bin. The scores of fries 144 of at least two of the samples may be used for one or more of: 1) determining when to sell and/or process the potatoes from the common bin from which the samples were acquired; 2) adjusting at least one condition in the common bin from which the samples were acquired; and 3) monitoring a condition of the potatoes in the common bin from which the samples were acquired. Retention of fry sample database records 110 over time also allows for comparison of crops from year-to-year on a more consistent and meaningful basis.

Each fry 144 in a common color image 70 may come from a single farm (database field 112 of the fry sample database record 110 of FIG. 3), one or more fields of a farm (database field 114 of the fry sample database record 110 of FIG. 3), or both. The assigned fry score fries 144 in the same color image 70 may be used to evaluate/modify one or more aspects associated with the production of potatoes (e.g., to identify procedures and/or conditions that contribute to the most positive outcomes for product quality).

The steps of any method, algorithm, or other functionality described may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

The foregoing description of the present invention has been presented for purposes of illustration and description. Furthermore, the description is not intended to limit the invention to the form disclosed herein (e.g., features implementing functions may also be physically located at various positions, including being distributed such that portions of functions are implemented at different physical locations). Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for assessing a potato segment, comprising the steps of:
   acquiring a color image of a potato segment using a camera;
   transmitting said color image from said camera to memory that is computer-readable;
   reading data from each potato segment pixel of said color image in said memory, wherein each said potato segment pixel is designated as being part of said potato segment; and
   executing a potato segment scoring color analysis using a computer operatively interconnected with said memory and comprising:
      acquiring from said data at least a first color value and a second color value for each said potato segment pixel;
      assessing each said potato segment pixel in relation to at least one of a plurality of color value sets, wherein each color value set of said plurality of color value sets has at least a first color value requirement, a second color value requirement, and a score, wherein said first color value requirement, said second color value requirement, and said score of each said color value set is different from said first color value requirement, said second color value requirement, and said score for every other said color value set of said plurality of color value sets;
      executing a first assigning step comprising assigning each said potato segment pixel to said score for one of said plurality of color value sets and based upon its corresponding said first color value and said second color value complying with said first color value requirement and said second color value requirement of said one of said plurality of color value sets; and
      generating an assigned score for said potato segment, wherein said assigned score is said score that has been associated with the largest number of said potato segment pixels by said first assigning step.

2. The method of claim 1, wherein said potato segment is a fried French fry.

3. The method of claim 1, wherein said first assigning step of said potato segment scoring color analysis fails to utilize a third color value of said potato segment pixel.

4. The method of claim 1, wherein said plurality of color value sets includes only five different color value sets.

5. The method of claim 1:
   wherein said plurality of color value sets comprises a fourth color value set, a third color value set, a second color value set, a first color value set, and a base color value set;
   wherein a given said potato segment pixel is assigned by said first assigning step to said score of said fourth color value set if a fourth determining step is a pass and which requires both said first color value and said second color value of said given said potato segment pixel to comply with said first color value requirement and said second color value requirement, respectively, of said fourth color value set;
   wherein a given said potato segment pixel is assigned by said first assigning step to said score of said third color value set if said fourth determining step is a fail and if a third determining step is a pass and which requires both said first color value and said second color value of said given said potato segment pixel to comply with said first color value requirement and said second color value requirement, respectively, of said third color value set;
   wherein a given said potato segment pixel is assigned by said first assigning step to said score of said second color value set if said fourth determining step is a fail, if said third determining step is a fail, and if a second determining step is a pass and which requires both said first color value and said second color value of said given said potato segment pixel to comply with said first color value requirement and said second color value requirement, respectively, of said second color value set;
   wherein a given said potato segment pixel is assigned by said first assigning step to said score of said first color value set if said fourth determining step is a fail, if said third determining step is a fail, if said second determining step is a fail, and if a first determining step is a pass and which requires both said first color value and said second color value of said given said potato segment pixel to comply with said first color value requirement and said second color value requirement, respectively, of said first color value set; and
   wherein a given said potato segment pixel is assigned by said first assigning step to said score of said base color value set if said fourth determining step fails, if said third determining step fails, if said second determining step fails, and if said first determining step fails.

6. The method of claim 5, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

7. The method of claim 6, wherein:

wherein a given said potato segment pixel is displayed in said color of said fourth color value set if said fourth determining step passes;

wherein a given said potato segment pixel is displayed in said color of said third color value set if said fourth determining step fails and if said third determining step passes;

wherein a given said potato segment pixel is displayed in said color of said second color value set if said fourth determining step fails, if said third determining step fails, and if said second determining step passes;

wherein a given said potato segment pixel is displayed in said color of said first color value set if said fourth determining step fails, if said third determining step fails, if said second determining step fails, and if said first determining step passes; and wherein a given said potato segment pixel is displayed in said color of said base color value set if said fourth determining step fails, if said third determining step fails, if said second determining step fails, and if said first determining step fails.

8. The method of claim 5, wherein said score of said fourth color value set is a 4, wherein said score of said third color value set is a 3, wherein said score of said second color value set is a 2, wherein said score of said first color value set is a 1, and wherein said score of said base color value set is a 0.

9. The method of claim 1:

wherein said plurality of color value sets comprises a fourth color value set, a third color value set, a second color value set, a first color value set, and a base color value set;

wherein a given said potato segment pixel is assigned by said first assigning step to said score of said fourth color value set if said first color value of said given said potato segment pixel is within a first color value range of said first color value requirement for said fourth color value set and if said second color value of said given said potato segment pixel is within a second color value range of said second color value requirement for said fourth color value set;

wherein a given said potato segment pixel is assigned by said first assigning step to said score of said third color value set if said first color value of said given said potato segment pixel is within a first color value range of said first color value requirement for said third color value set and if said second color value of said given said potato segment pixel is within a second color value range of said second color value requirement for said third color value set;

wherein a given said potato segment pixel is assigned by said first assigning step to said score of said second color value set if said first color value of said given said potato segment pixel is within a first color value range of said first color value requirement for said second color value set and if said second color value of said given said potato segment pixel is within a second color value range of said second color value requirement for said second color value set;

wherein a given said potato segment pixel is assigned by said first assigning step to said score of said first color value set if said first color value of said given said potato segment pixel is within a first color value range of said first color value requirement for said first color value set and if said second color value of said given said potato segment pixel is within a second color value range of said second color value requirement for said first color value set;

wherein a given said potato segment pixel is assigned by said first assigning step to said score of said base color value set if said potato segment pixel is not assigned to said score for any of said first color value set, said second color value set, said third color value set, and said fourth color value set.

10. The method of claim 1, wherein each said color value set further has a color, wherein said color of a given said color value set is different from said color for every other said color value set of said plurality of color value sets, said method further comprising the step of:

displaying an electronic image of said potato segment where each said potato segment pixel is presented in said color of said one of said plurality of color value sets.

11. The method of claim 1, further comprising displaying said assigned score for said potato segment.

12. The method of claim 1, further comprising the steps of:

disposing said potato segment on a base, wherein said color image comprises said potato segment and said base; and distinguishing said potato segment from said base, wherein said distinguishing step is executed by said computer and comprises identifying each said potato segment pixel for purposes of said potato segment scoring color analysis.

13. The method of claim 12, wherein said distinguishing step comprises said computer executing a potato segment identification color analysis based on said color image, and wherein said potato segment identification color analysis comprises:

acquiring a first plurality of color values for each of a plurality of first pixels; and assessing said first plurality of color values for each said first pixel against a plurality of color value relationships; and identifying each said first pixel whose plurality of color values satisfy each of said plurality of color value relationships;

said method further comprising:

using said first pixels from said identifying step of said potato segment identification color analysis to identify each said potato segment in said color image, wherein each said potato segment in said color image is collectively defined by a different plurality of said potato segment pixels in said color image.

14. The method of claim 13, further comprising resizing said color image, wherein said potato segment identification color analysis is executed on said color image after said resizing step.

15. The method of claim 13, wherein said first plurality of different color values for said potato segment identification color analysis comprises a first color value, a second color value, and a third color value.

16. The method of claim 15, wherein said plurality of color value relationships of said potato segment identification color analysis comprises a first color value relationship and a second color value relationship, wherein said assessing step of said potato segment identification color analysis in relation to a given said first pixel further comprises assessing said first color value of said given said first pixel and said second color value of said given said first pixel against each of said first color value relationship and said second color value relationship.

17. The method of claim 16, wherein said plurality of color value relationships of said potato segment identification color analysis further comprises a third color value relationship, and wherein said assessing step of said potato segment identification color analysis further comprises assessing said first color value of said given said first pixel, said second color value of said given said first pixel, and said third color value of said given said first pixel against said third color value relationship.

18. The method of claim 15, wherein said plurality of color value relationships of said potato segment identification color analysis comprises a first color value relationship and a second color value relationship, wherein said first color value of said given said first pixel is a red color value and said second color value of said given said first pixel is a green color value, wherein said assessing step of said potato segment identification color analysis in relation to a given said first pixel further comprises assessing said red color value of said given said first pixel and said green color value of said given said first pixel against each of said first color value relationship and said second color value relationship.

19. The method of claim 1, wherein a sample comprises a plurality of potato segments, wherein said method is executed in relation to said sample such that said acquiring a color image step is executed for said sample, such that said transmitting step is executed for said color image of said sample, such that said reading step is executed for said color image of said sample, and such that said potato segment scoring color analysis is executed for each said potato segment of said color image.

20. The method of claim 1, wherein a sample comprises a plurality of potato segments, wherein each said sample is associated with a different time, and wherein said method is separately executed in relation to each said sample such that said acquiring a color image step is executed for each said sample, such that said transmitting step is executed for each said color image, such that said reading step is executed for each said color image, and such that said potato segment scoring color analysis is executed for each said potato segment of each said color image.

21. The method of claim 20, further comprising storing information in a separate record in said memory for each said sample.

22. The method of claim 20, wherein each said sample is from a common storage receptacle comprising a plurality of potatoes.

23. The method of claim 22, further comprising using said assigned score for said plurality of potato segments of at least two said samples to determine when to sell said plurality of potatoes in said common storage receptacle.

24. The method of claim 22, further comprising using said assigned score for said plurality of potato segments of at least two said samples to adjust at least one condition in said common storage receptacle.

25. The method of claim 22, further comprising monitoring a condition of said plurality of potatoes in said common storage receptacle, wherein said monitoring step comprises using said assigned score for said plurality of potato segments of at least two said samples.

\* \* \* \* \*